(12) United States Patent
Oike

(10) Patent No.: US 11,163,218 B2
(45) Date of Patent: Nov. 2, 2021

(54) PROJECTION SYSTEM, POSITION DETECTION SYSTEM, AND POSITION DETECTION METHOD

(71) Applicant: SEIKO EPSON CORPORATION, Tokyo (JP)

(72) Inventor: Takumi Oike, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/999,207

(22) Filed: Aug. 21, 2020

(65) Prior Publication Data

US 2021/0055630 A1 Feb. 25, 2021

(30) Foreign Application Priority Data

Aug. 22, 2019 (JP) .............................. JP2019-151785

(51) Int. Cl.
  *G03B 21/14* (2006.01)
  *G03B 17/54* (2021.01)
  *G03B 21/26* (2006.01)
  *H04N 9/31* (2006.01)

(52) U.S. Cl.
  CPC ........... *G03B 17/54* (2013.01); *G03B 21/145* (2013.01); *G03B 21/26* (2013.01); *H04N 9/3108* (2013.01); *H04N 9/3197* (2013.01)

(58) Field of Classification Search
  CPC .... G03B 21/006; G03B 21/008; G03B 21/28; G03B 21/145; G03B 21/208; G03B 17/14; G03B 17/54; G03B 17/561; H04N 9/315; H04N 9/3108; H04N 9/3158; H04N 9/3161; H04N 9/3194; H04N 9/3197
  See application file for complete search history.

(56) References Cited

U.S. PATENT DOCUMENTS

| | | |
|---|---|---|
| 2003/0085871 A1 | 5/2003 | Ogawa |
| 2012/0235019 A1 | 9/2012 | Kiyose et al. |
| 2013/0063401 A1 | 3/2013 | Ouchida |
| 2015/0324054 A1 | 11/2015 | Kobayashi et al. |

(Continued)

FOREIGN PATENT DOCUMENTS

| | | |
|---|---|---|
| JP | 2003-114755 A | 4/2003 |
| JP | 2012-189532 A | 10/2012 |
| JP | 2013-61552 A | 4/2013 |

(Continued)

*Primary Examiner* — Sultan Chowdhury
(74) *Attorney, Agent, or Firm* — Dority & Manning, P.A.

(57) ABSTRACT

A projection system includes a first camera that captures an image of a projection surface, a second camera that is disposed in a position different from the position of the first camera and captures an image, a first light radiator that radiates light having a first optical characteristic onto the projection surface, a second light radiator that radiates light having a second optical characteristic different from the first optical characteristic onto the projection surface, and a detection section that detects a pointing element based on a first captured image captured with the first camera, detects another pointing element based on a second captured image captured with the second camera, and detects a position at which the pointing element is pointing and a position which is located on the projection surface and at which the other pointing element is pointing based on the first and second captured images.

8 Claims, 17 Drawing Sheets

(56) References Cited

U.S. PATENT DOCUMENTS

2018/0120960 A1* 5/2018 Uchiyama ............ G06F 3/0386
2018/0275832 A1 9/2018 Toyooka et al.

FOREIGN PATENT DOCUMENTS

| JP | 2013-239102 A | 11/2013 |
| JP | 2014-059695 A | 4/2014 |
| JP | 2016-164704 A | 9/2016 |
| JP | 2017-142726 A | 8/2017 |
| JP | 2018-163217 A | 10/2018 |

* cited by examiner

FIG. 3

| POINTING ELEMENT 500A | | POINTING ELEMENT 500B | |
|---|---|---|---|
| SHAFT SECTION 520A | FRONT END SECTION 510A | SHAFT SECTION 520B | FRONT END SECTION 510B |
| FIRST RECURSIVE REFLECTOR | THIRD RECURSIVE REFLECTOR | SECOND RECURSIVE REFLECTOR | FOURTH RECURSIVE REFLECTOR |
| REFLECTION (SECOND INFRARED LIGHT) < REFLECTION (FIRST INFRARED LIGHT) | REFLECTION (FIRST INFRARED LIGHT), REFLECTION (SECOND INFRARED LIGHT) ≥ PREDETERMINED VALUE | REFLECTION (FIRST INFRARED LIGHT) < REFLECTION (SECOND INFRARED LIGHT) | REFLECTION (FIRST INFRARED LIGHT), REFLECTION (SECOND INFRARED LIGHT) ≥ PREDETERMINED VALUE |

FIG. 4

| IMAGING SECTION/CAPTURED IMAGE | | FIRST CAPTURED IMAGE FROM FIRST CAMERA 52a | SECOND CAPTURED IMAGE FROM SECOND CAMERA 52b |
|---|---|---|---|
| POINTING ELEMENT 500A | FRONT END SECTION 510A | CONTACT DETECTION | CONTACT DETECTION |
| | SHAFT SECTION 520A | IDENTIFICATION DETECTION | — |
| POINTING ELEMENT 500B | FRONT END SECTION 510B | CONTACT DETECTION | CONTACT DETECTION |
| | SHAFT SECTION 520B | — | IDENTIFICATION DETECTION |

FIG. 18

| BRIGHT SPOT CANDIDATE | POINTING ELEMENT 500A | POINTING ELEMENT 500B | CAPTURED IMAGE/ IMAGING SECTION | AREA DETECTION CONDITIONS |
|---|---|---|---|---|
| FIRST BRIGHT SPOT CANDIDATE | FRONT END SECTION 510A | FRONT END SECTION 510B | FIRST CAPTURED IMAGE FROM FIRST CAMERA 52a | PIXEL VALUE ≥ FIRST THRESHOLD, NUMBER OF PIXELS: WITHIN FIRST RANGE |
| SECOND BRIGHT SPOT CANDIDATE | SHAFT SECTION 520A | — | | PIXEL VALUE ≥ FIRST THRESHOLD, NUMBER OF PIXELS: WITHIN SECOND RANGE |
| THIRD BRIGHT SPOT CANDIDATE | FRONT END SECTION 510A | FRONT END SECTION 510B | SECOND CAPTURED IMAGE FROM SECOND CAMERA 52b | PIXEL VALUE ≥ FIRST THRESHOLD, NUMBER OF PIXELS: WITHIN FIRST RANGE |
| FOURTH BRIGHT SPOT CANDIDATE | — | SHAFT SECTION 520B | | PIXEL VALUE ≥ FIRST THRESHOLD, NUMBER OF PIXELS: WITHIN SECOND RANGE |

FIG. 19

| BRIGHT SPOT CANDIDATE | CONVERSION INFORMATION | POSITION IN PROJECTOR COORDINATES |
|---|---|---|
| FIRST BRIGHT SPOT CANDIDATE | FIRST CONVERSION LOOKUP TABLE | FIRST POSITION COORDINATES |
| SECOND BRIGHT SPOT CANDIDATE | FIRST CONVERSION LOOKUP TABLE | SECOND POSITION COORDINATES |
| THIRD BRIGHT SPOT CANDIDATE | SECOND CONVERSION LOOKUP TABLE | THIRD POSITION COORDINATES |
| FOURTH BRIGHT SPOT CANDIDATE | SECOND CONVERSION LOOKUP TABLE | FOURTH POSITION COORDINATES |

FIG. 20

| CLASSIFICATION | CLASSIFICATION CONDITIONS | CAPTURED IMAGE |
|---|---|---|
| BRIGHT SPOT CANDIDATE CORRESPONDING TO FRONT END SECTION 510A OF POINTING ELEMENT 500A | FIRST BRIGHT SPOT CANDIDATE LOCATED IN CIRCLE HAVING CENTER CORRESPONDING TO SECOND BRIGHT SPOT CANDIDATE AND HAVING RADIUS CORRESPONDING TO PREDETERMINED NUMBER OF PIXELS | FIRST CAPTURED IMAGE |
| BRIGHT SPOT CANDIDATE CORRESPONDING TO FRONT END SECTION 510B OF POINTING ELEMENT 500B | FIRST BRIGHT SPOT CANDIDATE LOCATED OUTSIDE CIRCLE HAVING CENTER CORRESPONDING TO SECOND BRIGHT SPOT CANDIDATE AND HAVING RADIUS CORRESPONDING TO PREDETERMINED NUMBER OF PIXELS | |
| BRIGHT SPOT CANDIDATE CORRESPONDING TO FRONT END SECTION 510A OF POINTING ELEMENT 500A | THIRD BRIGHT SPOT CANDIDATE LOCATED OUTSIDE CIRCLE HAVING CENTER CORRESPONDING TO FOURTH BRIGHT SPOT CANDIDATE AND HAVING RADIUS CORRESPONDING TO PREDETERMINED NUMBER OF PIXELS | SECOND CAPTURED IMAGE |
| BRIGHT SPOT CANDIDATE CORRESPONDING TO FRONT END SECTION 510B OF POINTING ELEMENT 500B | THIRD BRIGHT SPOT CANDIDATE LOCATED IN CIRCLE HAVING CENTER CORRESPONDING TO FOURTH BRIGHT SPOT CANDIDATE AND HAVING RADIUS CORRESPONDING TO PREDETERMINED NUMBER OF PIXELS | |

FIG. 21

| CONDITIONS OF EVALUATION USING CAPTURED IMAGES | | CONTACT | IDENTIFICATION | |
|---|---|---|---|---|
| $\Delta Xp, \Delta Yp \leq$ THIRD THRESHOLD | | IN CONTACT | CORRESPONDING TO SECOND BRIGHT SPOT CANDIDATE | POINTING ELEMENT 500A |
| | | | CORRESPONDING TO FOURTH BRIGHT SPOT CANDIDATE | POINTING ELEMENT 500B |
| THIRD THRESHOLD $< \Delta Xp, \Delta Yp$ $\leq$ FOURTH THRESHOLD | | HOVERING | CORRESPONDING TO SECOND BRIGHT SPOT CANDIDATE | POINTING ELEMENT 500A |
| | | | CORRESPONDING TO FOURTH BRIGHT SPOT CANDIDATE | POINTING ELEMENT 500B |

PROJECTION SYSTEM, POSITION DETECTION SYSTEM, AND POSITION DETECTION METHOD

The present application is based on, and claims priority from JP Application Serial Number 2019-151785, filed Aug. 22, 2019, the disclosure of which is hereby incorporated by reference herein in its entirety.

BACKGROUND

1. Technical Field

The present disclosure relates to a projection system, a position detection system, and a position detection method.

2. Related Art

An electronic pen that emits light via the tip of the pen when used in writing is combined with a projector and a personal computer (PC) into a projection system that virtually displays a pseudo-trajectory written on a writing receiving surface, such as a whiteboard, on the writing receiving surface. JP-A-2014-059695 discloses a projection system that allows a plurality of users to each use a light emitting electronic pen for simultaneous writing, and to this end, the projection system has the function of simultaneously identifying the plurality of electronic pens. JP-A-2013-239102 discloses a technology for achieving pseudo-light-emission from the tip of a pen, which is a coordinate pointing apparatus, by providing the pen with a recursive reflection material to detect a pen pointing coordinate position based on a light reception timing at which a detector receives the emitted light.

The electronic pen having a self-luminous pen tip has a problem of a large amount of electric power consumed by the light emission from the pen tip, resulting in an increase in the frequency of exchange or charge of the battery. On the other hand, the technology disclosed in JP-A-2013-239102 has a problem of inability to identify a plurality of pens.

SUMMARY

A projection system according to an aspect of the present disclosure is a projection system including a projector that projects a projection image on a projection surface and a first pointing element and a second pointing element that each point at the projection surface. The first pointing element includes a first recursive reflector having a first reflection characteristic, and the second pointing element includes a second recursive reflector having a second reflection characteristic different from the first reflection characteristic. The projector includes a first camera that captures an image of the projection surface, a second camera that is disposed in a position different from a position of the first camera and captures an image of the projection surface, a first light radiator that is provided in correspondence with the first camera and radiates light having a first optical characteristic onto the projection surface, a second light radiator that is provided in correspondence with the second camera and radiates light having a second optical characteristic different from the first optical characteristic onto the projection surface, and a detection section that detects the first pointing element based on a first captured image provided when the first camera captures an image of the projection surface, detects the second pointing element based on a second captured image provided when the second camera captures an image of the projection surface, and detects a position which is located on the projection surface and at which the first pointing element is pointing and a position which is located on the projection surface and at which the second pointing element is pointing based on the first and second captured images.

A position detection system according to another aspect of the present disclosure is a position detection system including a first pointing element and a second pointing element that each point at an operation surface and a position detection apparatus that detects positions at which the first and second pointing elements are pointing. The first pointing element includes a first recursive reflector having a first reflection characteristic, and the second pointing element includes a second recursive reflector having a second reflection characteristic different from the first reflection characteristic. The position detection apparatus includes a first camera that captures an image of the operation surface, a second camera that is disposed in a position different from a position of the first camera and captures an image of the operation surface, a first light radiator that is provided in correspondence with the first camera and radiates light having a first optical characteristic onto the operation surface, a second light radiator that is provided in correspondence with the second camera and radiates light having a second optical characteristic different from the first optical characteristic onto the operation surface, and a detection section that detects the first pointing element based on a first captured image provided when the first camera captures an image of the operation surface, detects the second pointing element based on a second captured image provided when the second camera captures an image of the operation surface, and detects a position which is located on the operation surface and at which the first pointing element is pointing and a position which is located on the operation surface and at which the second pointing element is pointing based on the first and second captured images.

A position detection method according to another aspect of the present disclosure is a method for controlling a position detection system including a first pointing element and a second pointing element that each point at an operation surface and a position detection apparatus that detects positions at which the first and second pointing elements are pointing. The first pointing element includes a first recursive reflector having a first reflection characteristic, and the second pointing element includes a second recursive reflector having a second reflection characteristic different from the first reflection characteristic. The position detection apparatus detects the first pointing element based on a first captured image provided when a first camera captures an image of the operation surface, the first camera provided in correspondence with a first light radiator that radiates light having a first optical characteristic onto the operation surface, detects the second pointing element based on a second captured image provided when a second camera captures an image of the operation surface, the second camera provided in correspondence with a second light radiator that radiates light having a second optical characteristic different from the first optical characteristic onto the operation surface, and detects a position which is located on the operation surface and at which the first pointing element is pointing and a position which is located on the operation surface and at which the second pointing element is pointing based on the first and second captured images.

BRIEF DESCRIPTION OF THE DRAWINGS

FIG. 3 shows an example of reflection configurations of pointing elements.

FIG. 4 shows the relationship between a first camera and a second camera in contact and identification detection.

FIG. 18 shows an example of detection of bright spot candidates.

FIG. 19 shows an example of conversion of the bright spot candidates.

FIG. 20 shows an example of classification of the bright spot candidates.

FIG. 21 shows an example of evaluation of contact and identification detection.

DESCRIPTION OF EXEMPLARY EMBODIMENTS

Figure 1:
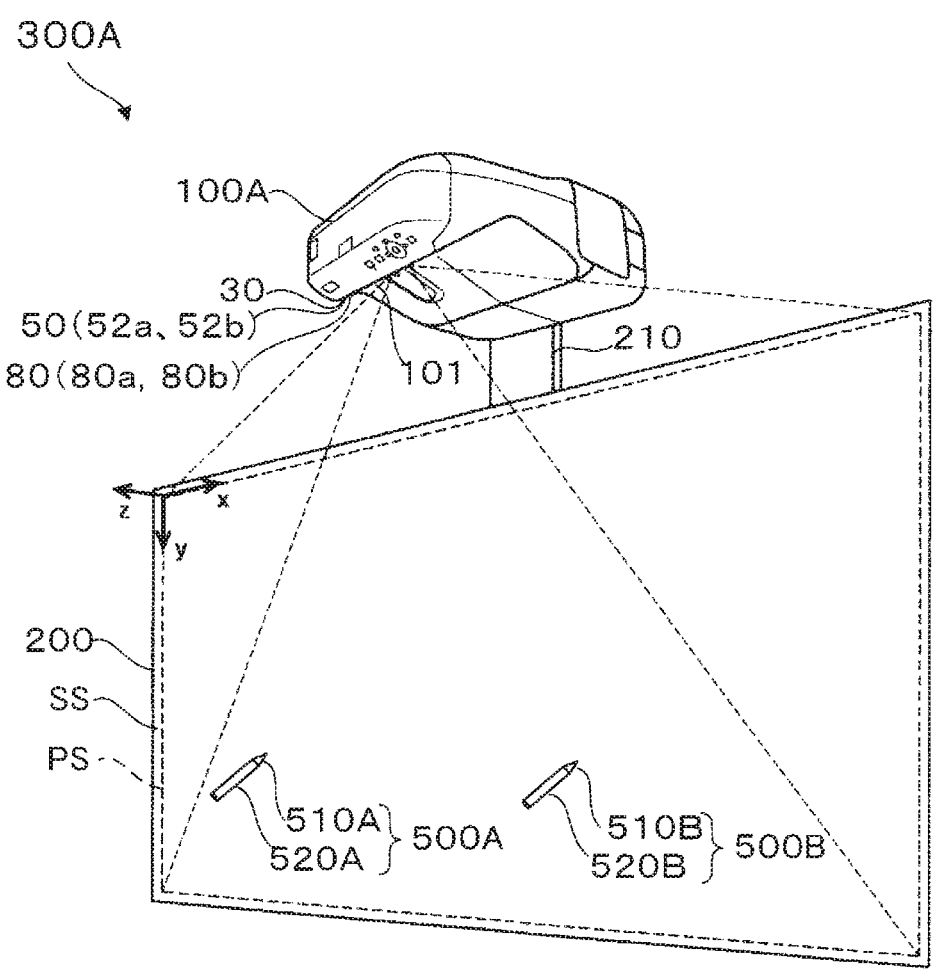
FIG. 1 is a perspective view of a projection system according a first embodiment of the present disclosure.

Embodiments will be described below with reference to the drawings. In the drawings, the dimension and scale of each portion, however, differ from actual values as appropriate. Further, a variety of technically preferable restrictions are imposed on the embodiments described below, and the embodiments are not necessarily configured as described below.

1. First Embodiment

Figure 2:
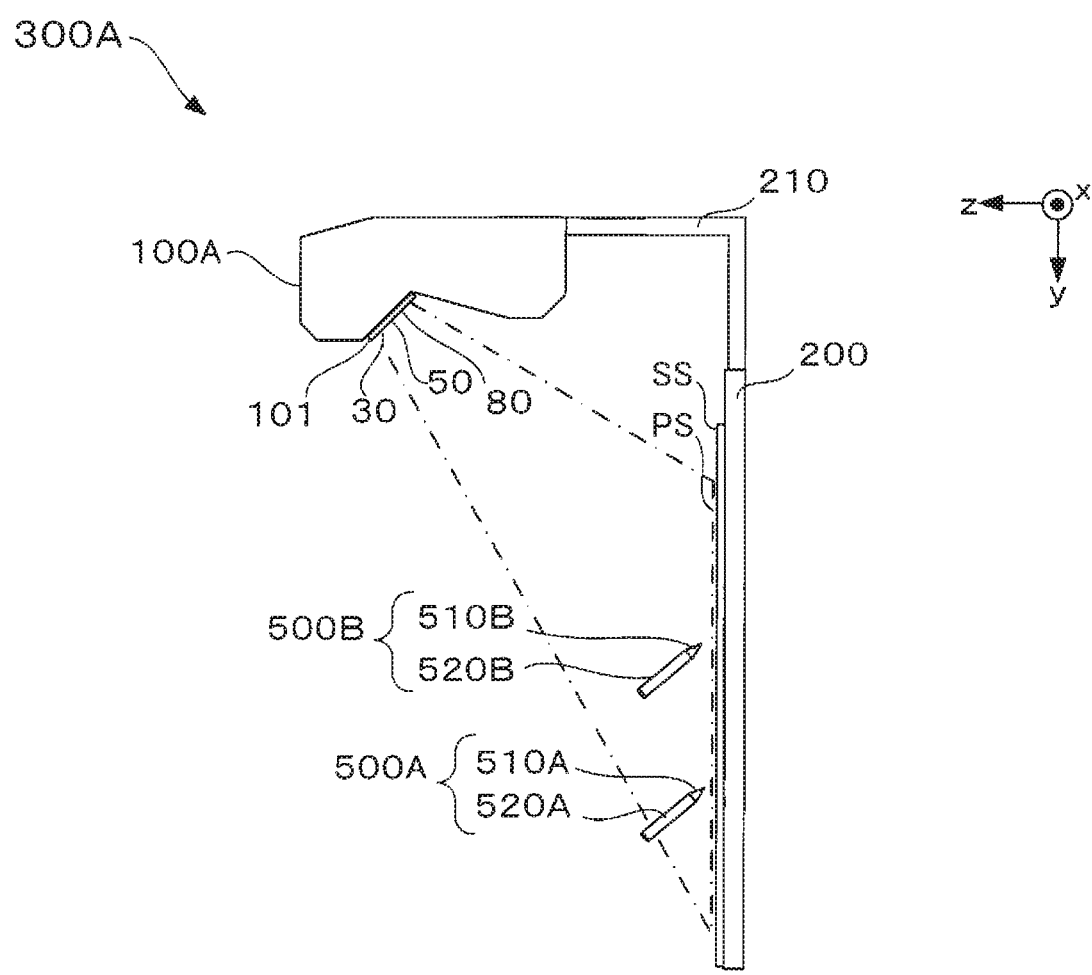
FIG. 2 is a side view of the projection system according to the first embodiment of the present disclosure.

FIG. 1 is a perspective view of a projection system 300A according an embodiment of the present disclosure. FIG. 2 is a side view of the projection system 300A. The projection system 300A includes a projector 100A, a projection plate 200, a pointing element 500A, and a pointing element 500B. The front surface of the projection plate 200 is used as a projection surface SS, on which an image is projected by the projector 100A. The projector 100A is fixed by a support member 210 in front of the projection plate 200 and vertically above the projection plate 200. In the following description, the vertical direction is called an axis-y direction, the direction of a normal to the projection plate 200 is called an axis-z direction, and the axis perpendicular to both the axes y and z is called an axis x, as shown in FIG. 1. The axis x is an example of a first coordinate axis perpendicular to the normal to the projection surface SS, and the axis y is an example of a second coordinate axis perpendicular to both the first coordinate axis and the normal to the projection surface SS. In FIG. 1, the projection plate 200 is so disposed as to vertically stand and can instead be so disposed as to horizontally lie. In the latter case, the projector 100A can be disposed vertically above the projection plate 200 to form the projection system 300A. The projection system 300A can also be configured as a position detection system including the pointing elements 500A and 500B and a position detection apparatus that is formed of the projector 100A.

The projector 100A projects a projection image PS via a projection section 30 on the projection surface SS of the projection plate 200. The projection image PS is an example of the image projected on the projection plate 200 by the projector 100A. The projection image PS typically includes an image having been drawn in the projector 100A. When the projector 100A has no drawn image therein, the projector 100A radiates light onto the projection surface SS to display a white image. In the present specification, the projection surface SS means a surface of a member on which an image is projected. The projection image PS means the area of the image projected on the projection surface SS from the projector 100A. The projection image PS is typically projected on part of the projection surface SS.

The pointing elements 500A and 500B are each, for example, an electronic-pen-shaped nonluminous pointing element that consumes no electric power. The pointing element 500A is an example of a first pointing element provided in the projection system 300A, and the pointing element 500B is an example of a second pointing element provided in the projection system 300A. The pointing element 500A includes a front end section 510A and a shaft section 520A, which is held by a user of the pointing element 500A. The pointing element 500B includes a front end section 510B and a shaft section 520B, which is held by a user of the pointing element 500B. The front end section 510A of the pointing element 500A is an example of a first front end section, and the shaft section 520A of the pointing element 500A is an example of a first shaft section. The front end section 510B of the pointing element 500B is an example of a second front end section, and the shaft section 520B of the pointing element 500B is an example of a second shaft section. In the following description, when it is unnecessary to distinguish the pointing elements 500A and 500B from each other, the pointing elements 500A and 500B, the front end sections 510A and 510B, and the shaft sections 520A and 520B are collectively referred to as pointing elements 500, front end sections 510, and shaft sections 520, respectively.

The shaft section 520A of the pointing element 500A is provided with a first recursive reflector having reflectance of second infrared light lower than the reflectance of first infrared light. The shaft section 520B of the pointing element 500B is provided with a second recursive reflector having reflectance of the first infrared light lower than the reflectance of the second infrared light. The front end section 510A of the pointing element 500A is provided with a third recursive reflector having reflectance of the first infrared light and reflectance of the second infrared light each being higher than or equal to a predetermined value. The front end section 510B of the pointing element 500B is provided with a fourth recursive reflector having reflectance of the first infrared light and reflectance of the second infrared light each being higher than or equal to the predetermined value. FIG. 3 shows an example of reflection configurations of the pointing elements 500A and 500B. The first, second, third, and fourth recursive reflectors are each formed of a recursive reflection member. The recursive reflection means reflection that causes the angle of incidence to be equal to the angle of emergence. Light is therefore reflected in the direction in which the light is incident. A recursive reflection material always reflects light incident in any direction in the direction in which the light is incident. It is, however, noted that when the angle of incidence of light increases, the angle of emergence of the light deviates from the angle of incidence, but a minute amount of change in the angle of emergence is considered as an approximation. Reflection that causes the angle of incidence is substantially equal to the angle of emergence is considered as the recursive reflection. The first recursive reflector, which has reflectance of infrared light that belongs to a second wavelength range lower than the reflectance of infrared light that belongs to a first wavelength range, is an example of a first recursive reflector having a first reflection characteristic. The second recursive reflector, which has reflectance of infrared light that belongs to the first wavelength range lower than the reflectance of infrared light that belongs to the second wavelength range, is an example of a second recursive reflector having a second reflection characteristic.

The projector 100A radiates the first infrared light and the second infrared light via a light radiator 80 toward the projection surface SS. The first infrared light and the second infrared light differ from each other in terms of, for example, the wavelength range and the polarization state. The projector 100A causes a first camera 52a and a second camera 52b of an imaging section 50 to each capture an image of the projection surface SS to acquire an image of the state of the reflected infrared light. When the user causes the pointing element 500A or 500B to approach the projection surface SS, the third recursive reflector at the front end section 510A or the fourth recursive reflector at the front end section 510B reflects the first infrared light and the second infrared light, and bright spots according to the reflected first infrared and second infrared light are displayed in a first captured image captured with the first camera 52a and a second captured image captured with the second camera 52b. Further, the first recursive reflector at the shaft section 520A reflects the first infrared light, and a bright spot according to the reflected first infrared light is displayed in the first captured image captured with the first camera 52a. The second recursive reflector at the shaft section 520B reflects the second infrared light, and a bright spot according to the reflected second infrared light is displayed in the second captured image captured with the second camera 52b. The projector 100A analyzes the first and second captured images to detect the front end section 510A of the pointing element 500A and the front end section 510B of the pointing element 500B and evaluates whether or not the front end section 510A or the front end section 510B is in contact with the projection surface SS. The projector 100A further analyzes the first captured image to detect the shaft section 520A of the pointing element 500A, analyzes the second captured image to detect the shaft section 520B of the pointing element 500B, and identifies the pointing element 500A and the pointing element 500B. FIG. 4 shows the relationship between the first camera 52a and the second camera 52b in the contact and identification detection.

Figure 5:
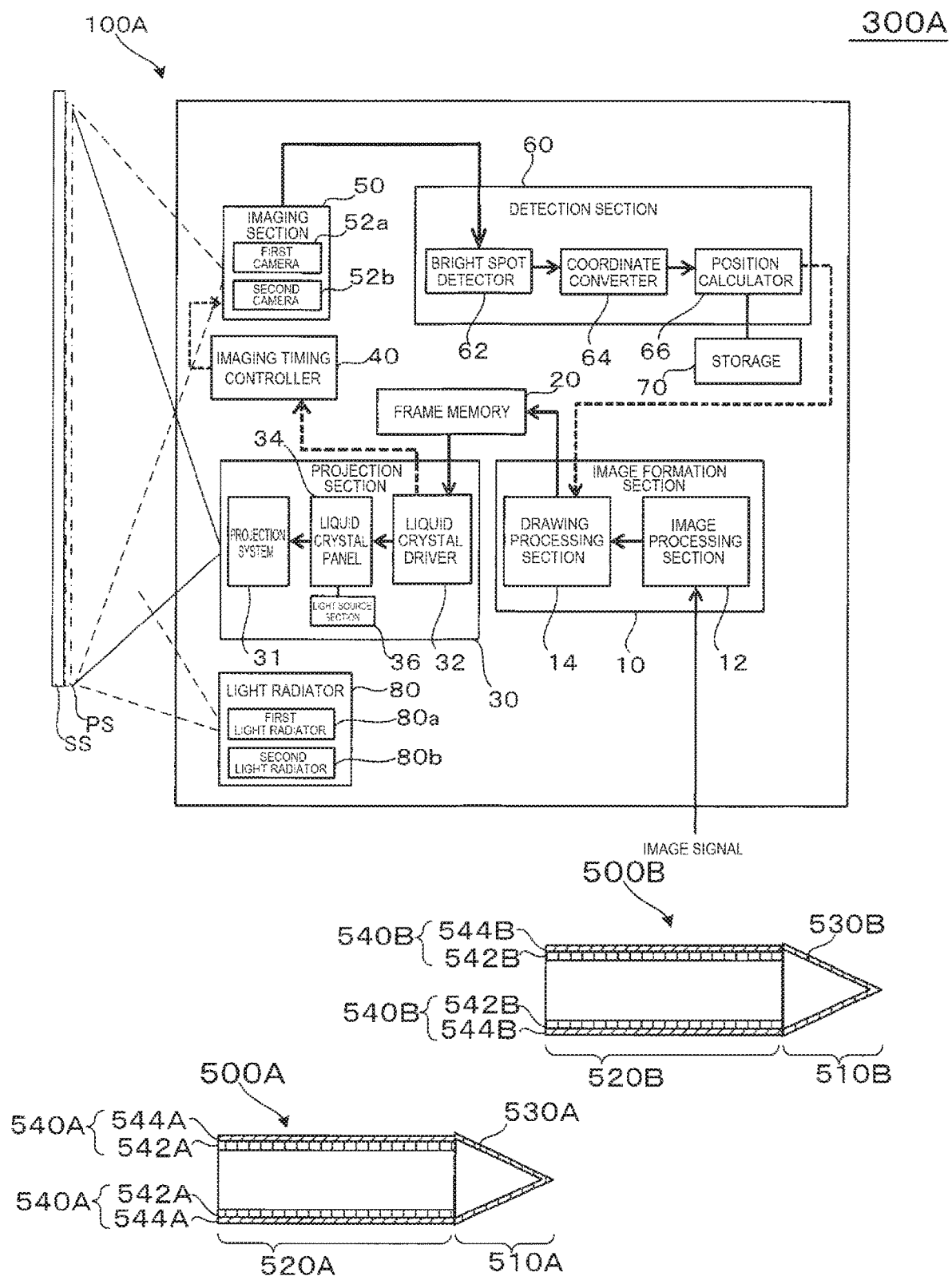
FIG. 5 is a block diagram showing an example of the configurations of a projector and the pointing elements provided in the projection system.

FIG. 5 is a block diagram showing an example of the configurations of the projector 100A and the pointing elements 500A and 500B. The pointing elements 500A and 500B are each diagrammatically shown in the form of a cross section. The surface of the front end section 510A of the pointing element 500A is provided with a recursive reflector 530A, and the surface of the front end section 510B of the pointing element 500B is provided with a recursive reflector 530B. The recursive reflectors 530A and 530B are each made of a recursive reflection material having reflectance of the infrared light that belongs to the first wavelength range and the infrared light that belongs to the second wavelength range being higher than a predetermined value. The recursive reflectors 530A and 530B therefore reflect the infrared light that belongs to the first wavelength range and the infrared light that belongs to the second wavelength range. That is, the recursive reflector 530A provided at the front end section 510A of the pointing element 500A is an example of the third recursive reflector, and the recursive reflector 530B provided at the front end section 510B of the pointing element 500B is an example of the fourth recursive reflector. The infrared light that belongs to the first wavelength range is an example of light having a first optical characteristic, and the infrared light that belongs to the second wavelength range is an example of light having a second optical characteristic. For example, the infrared light that belongs to the first wavelength range is infrared light having wavelengths close to 850 nm, the infrared light that belongs to the second wavelength range is infrared light having wavelengths close to 940 nm, and the first wavelength range does not overlap with the second wavelength range, as will be described below.

The recursive reflector 540A is so provided at the shaft section 520A of the pointing element 500A as to cover the shaft section 520A, and the recursive reflector 540B is so provided at the shaft section 520B of the pointing element 500B as to cover the shaft section 520B. The recursive reflector 540A is so configured that a color filter 544A covers a recursive reflection member 542A. The recursive reflector 540B is so configured that a color filter 544B covers a recursive reflection member 542B. The recursive reflection members 542A and 542B each have reflectance of light that has passed through the color filter 544A or 544B and is incident on the recursive reflection member being greater than or equal to a predetermined value and reflect the incident light in the direction in which the light is incident more strongly than in the other directions.

Figure 6:
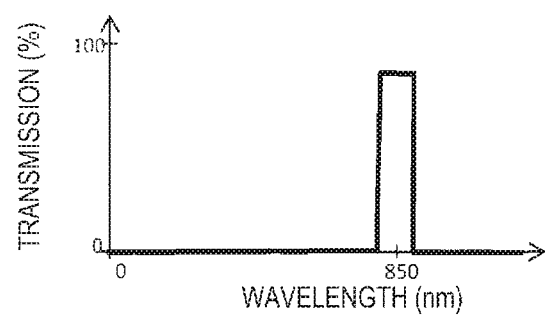
FIG. 6 shows an example of the transmission characteristic of a color filter of one of the pointing elements.
Figure 7:
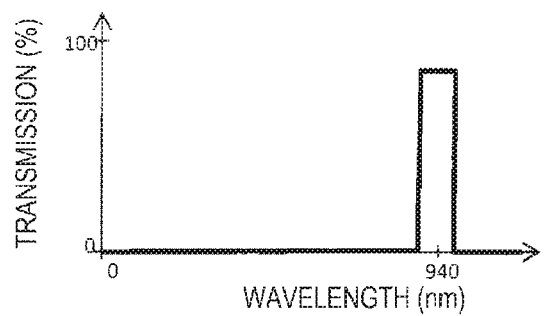
FIG. 7 shows an example of the transmission characteristic of a color filter of the other pointing element.

FIG. 6 shows an example of the transmission characteristic of the color filter 544A, and FIG. 7 shows an example of the transmission characteristic of the color filter 544B. The color filter 544A transmits the infrared light that belong to the first wavelength range but does not transmit the infrared light that belong to the second wavelength range, as shown in FIG. 6. The color filter 544B transmits the infrared light that belong to the second wavelength range but does not transmit the infrared light that belong to the first wavelength range, as shown in FIG. 7. Therefore, the recursive reflector 540A recursively reflects only the infrared light that belongs to the first wavelength range, and the recursive reflector 540B recursively reflects only the infrared light that belongs to the second wavelength range. The recursive reflector 540A is an example of the first recursive reflector, and the recursive reflector 540B is an example of the second recursive reflector.

The projector 100A includes an image formation section 10, a frame memory 20, the projection section 30, an imaging timing controller 40, the imaging section 50, a detection section 60, a storage 70, and the light radiator 80.

Figure 8:
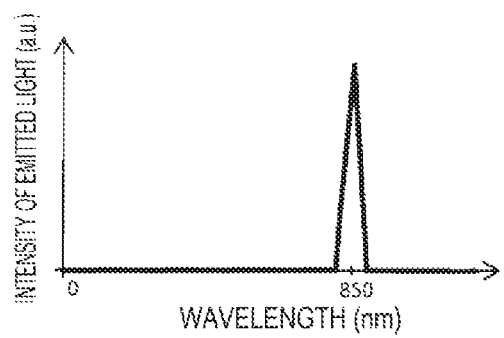
FIG. 8 shows an example of the distribution of the intensity of infrared light that is radiated from the projector onto a projection surface and belongs to a first wavelength range.
Figure 9:
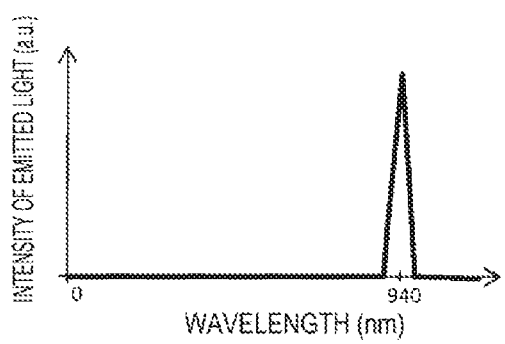
FIG. 9 shows an example of the distribution of the intensity of infrared light that is radiated from the projector onto the projection surface and belongs to a second wavelength range.

The light radiator 80 includes a first light radiator 80a and a second light radiator 80b. The first light radiator 80a includes an IR light source that emits the infrared light that belongs to the first wavelength range. The second light radiator 80b includes an IR light source that emits the infrared light that belongs to the second wavelength range. The IR light source of the first light radiator 80a is an example of a first light source that emits the infrared light that belongs to the first wavelength range, and the IR light source of the second light radiator 80b is an example of a second light source that emits the infrared light that belongs to the second wavelength range. The light radiator 80 radiates the infrared light emitted from each of the first light radiator 80a and the second light radiator 80b onto the projection surface SS. FIG. 8 shows an example of the distribution of the intensity of the infrared light that is radiated by the first light radiator 80a and belongs to the first wavelength range. FIG. 9 shows an example of the distribution of the intensity of the infrared light that is radiated by the second light radiator 80b and belongs to the second wavelength range. The infrared light that belongs to the first wavelength range is infrared light having wavelengths close to 850 nm, and the infrared light that belongs to the second wavelength range is infrared light having wavelengths close to 040 nm, as shown in FIGS. 8 and 9. The upper-limit wavelength of the first wavelength range is shorter than the lower-limit wavelength of the second wavelength range, and the first wavelength range does not overlap with the second wavelength range, as shown in FIGS. 8 and 9.

The image formation section 10 and the detection section 60 are each a software module achieved when a processor, such as a digital signal processor (DSP) or a central processing unit (CPU), is operated in accordance with software. The image formation section 10 includes an image processing section 12 and a drawing processing section 14. The image formation section 10 forms projection image data based on an image signal inputted thereto. Specifically, the image processing section 12 performs image processing on the image signal. Specific examples of the image processing may include color correction and image quality enhancement. The image signal having undergone the image processing undergoes a drawing process carried out by the drawing processing section 14. As an example of the drawing process, the trajectory of the front end section 510 of any of the pointing elements 500 is drawn on the projection surface SS based on position information provided from the detection section 60. The image formation section 10 is coupled to the frame memory 20. The image formation section 10 writes the projection image data having undergone the drawing process carried out by the drawing processing section 14 on the frame memory 20.

The frame memory 20 is a volatile memory having a storage area that stores the projection image data corresponding to one frame. The volatile memory refers to a storage device that cannot hold information stored therein when no electric power is supplied thereto. The frame memory 20 is coupled to the projection section 30 so that the projection section 30 can read the projection image data from the frame memory 20.

The projection section 30 projects the projection image PS on the projection surface SS in accordance with the projection image data stored in the frame memory 20. The projection section 30 includes a projection system 31 including a projection lens, a liquid crystal driver 32, a liquid crystal panel 34, and a light source section 36. The liquid crystal driver 32 reads the projection image data stored in the frame memory 20 and drives the liquid crystal panel 34. The liquid crystal driver 32 drives the liquid crystal panel 34 alternately in positive polarity operation and negative polarity operation to suppress ghosting on the liquid crystal panel 34. The liquid crystal driver 32 controls the liquid crystal panel 34 to cause it to display the projection image PS in the sequential scanning scheme. The liquid crystal driver 32 generates a drive timing signal representing the timing at which the liquid crystal panel 34 is driven and transmits the generated drive timing signal to the imaging timing controller 40. The light source section 36 includes, for example, a light source, such as a halogen lamp or a laser diode. The light from the light source section 36 is modulated by the liquid crystal panel 34 on a pixel basis and projected via the projection system 31 on the projection surface SS. That is, an image drawn on the liquid crystal panel 34 based on the projection image data is projected on the projection surface SS. The liquid crystal panel 34 is an example of a light modulator and may be replaced with a digital mirror device or any other light modulation device.

In the present embodiment, the projection section 30 switches the projection image PS to another in the line sequential scanning scheme. For example, the drawing on the liquid crystal panel 34 is performed on a line basis, and the drawn line is successively updated in the scan direction perpendicular to the line direction. The line sequential scanning may be replaced with the block sequential scanning.

The imaging timing controller 40 is coupled to the liquid crystal driver 32 and the imaging section 50. The imaging timing controller 40 generates an imaging timing signal based on the drive timing signal generated by the liquid crystal driver 32. The generated imaging timing signal is transmitted from the imaging timing controller 40 to the imaging section 50.

Figure 10:
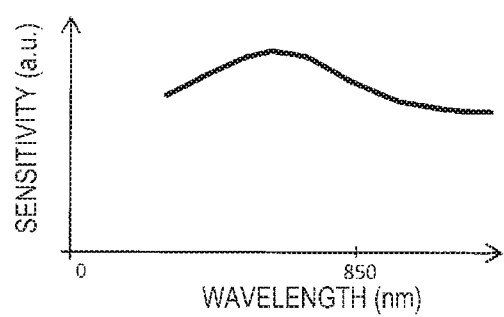
FIG. 10 shows an example of the sensitivity characteristic of the first and second cameras.

The imaging section 50 captures images of the projection surface SS to form captured image data. The timing at which the imaging section 50 performs the imaging is so controlled based on the imaging timing signal received from the imaging timing controller 40 that the imaging section 50 is driven in synchronization with the timing at which the projection section 30 is driven. The imaging section 50 includes the first camera 52a and the second camera 52b each so provided that the entire projection surface SS falls within the imaging field of the camera. The first camera 52a and the second camera 52b are disposed at positions different from each other. FIG. 10 shows an example of the imaging sensitivity characteristic of the first camera 52a and the second camera 52b. The first camera 52a and the second camera 52b each have sensitivity to visible light and infrared light, as shown in FIG. 10. The first camera 52a is an example of a first camera provided in the projector 100A, and the second camera 52b is an example of a second camera provided in the projector 100A. An image captured with the first camera 52a is an example of the first captured image, and an image captured with the second camera 52b is an example of the second captured image.

Figure 11:
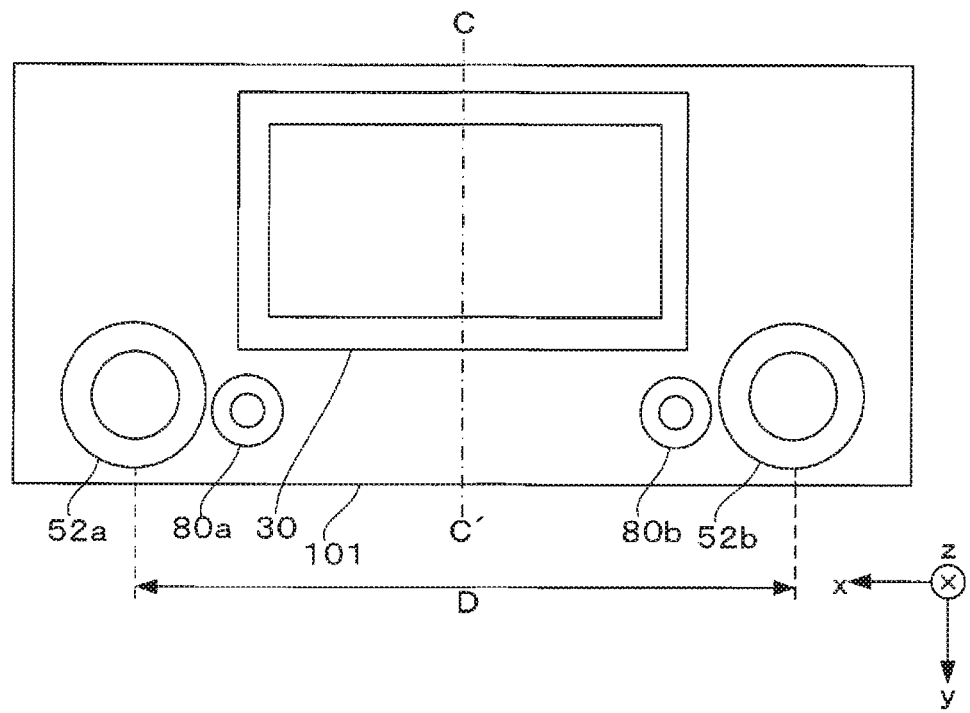
FIG. 11 shows an example of the arrangement of the first camera, the second camera, a first light radiator, and a second light radiator on a surface of the projector.

FIG. 11 shows an example of a surface 101 of the projector 100A shown in FIGS. 1 and 2. For example, the surface 101 faces the projection surface SS and is provided with an imaging lens of the first camera 52a, an imaging lens of the second camera 52b, a projection port for the projection section 30, a radiation port for the first light radiator 80a, and a radiation port for the second light radiator 80b. FIG. 11 shows an example of the arrangement of the projection port for the projection section 30, the radiation port for the first light radiator 80a, the radiation port for the second light radiator 80b, the imaging lens of the first camera 52a, and the imaging lens of the second camera 52b on the surface 101. For example, the projection port for the projection section 30 is provided on a line CC', which is the center line of the surface 101, and the imaging lens of the first camera 52a and the imaging lens of the second camera 52b are provided with a gap D therebetween along the axis x symmetrically with respect to the center line CC'. The first captured image captured with the first camera 52a and the second captured image captured with the second camera 52b have parallax therebetween, which allows calculation of the coordinates of the position of the front end section 510A of the pointing element 500A and the coordinates of the position of the front end section 510B of the pointing element 500B based on triangulation. The radiation port for the first light radiator 80a and the radiation port for the second light radiator 80b are provided symmetrically with respect to the center line CC', as shown in FIG. 11. In more detail, the radiation port for the first light radiator 80a is provided in the vicinity of the first camera 52a, and the radiation port for the second light radiator 80b is provided in the vicinity of the second camera 52b. In the configuration described above, the first camera 52a detects the light radiated from the first light radiator 80a and reflected off the recursive reflection members, but the second camera 52b does not. The second camera 52b detects the light radiated from the second light radiator 80b and reflected off the recursive reflection members, but the first camera 52a does not.

Figure 12:
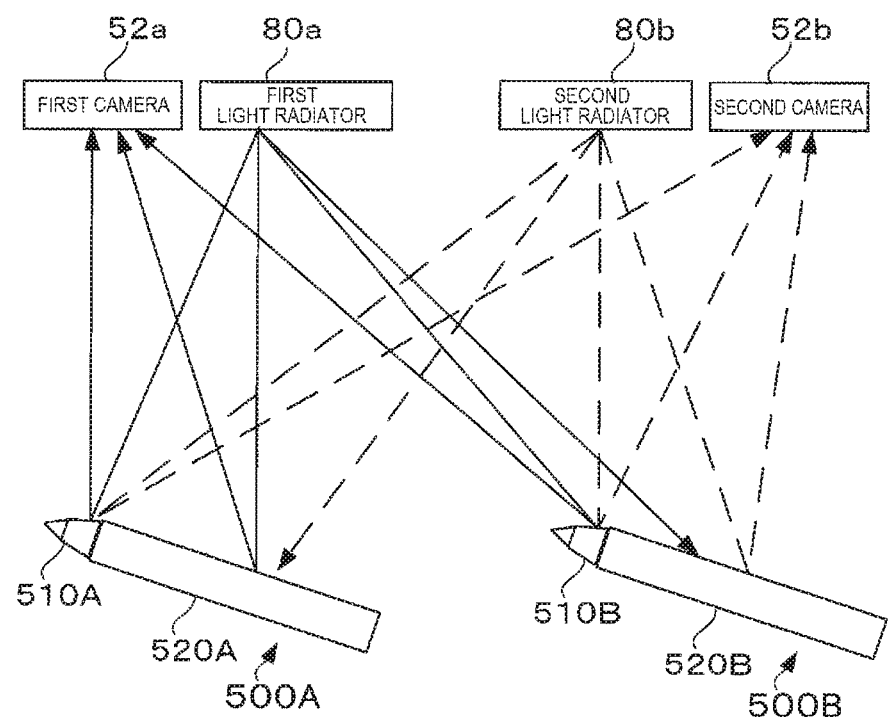
FIG. 12 shows an example of the optical paths of infrared light that is radiated from the first light radiator, is recursively reflected off the recursive reflectors of the pointing elements, and then reaches the first camera and the optical paths of infrared light that is radiated from the second light radiator, is recursively reflected off the recursive reflectors of the pointing elements, and then reaches the second camera.

FIG. 12 is a diagrammatic view showing an example of the optical paths of the infrared light that belongs to the first wavelength range, is radiated from the first light radiator 80a, is recursively reflected off the pointing element 500A or 500B, and then reaches the first camera 52a and the optical paths of the infrared light that belongs to the second wavelength range, is radiated from the second light radiator 80b, is recursively reflected off the pointing element 500A or 500B, and then reaches the second camera 52b. In FIG. 12, the optical paths of the infrared light that belongs to the first wavelength range and is radiated from the first light radiator 80a are drawn with the solid-line arrows, and the optical paths of the infrared light that belongs to the second wavelength range and is radiated from the second light radiator 80b are drawn with the broken-line arrows.

When the user of the pointing element 500A causes the front end section 510A of the pointing element 500A to approach the projection surface SS to write something on the projection image PS or otherwise manipulate the projection image PS, the infrared light that belongs to the first wavelength range and is radiated from the first light radiator 80a to the projection surface SS is more strongly reflected off the recursive reflector 530A and the recursive reflector 540A of the pointing element 500A in the direction in which the infrared light is incident than in the other directions. The first captured image captured with the first camera 52a therefore shows a bright spot corresponding to the light reflected off the front end section 510A of the pointing element 500A and a bright spot corresponding to the light reflected off the shaft section 520A of the pointing element 500A. On the other hand, the infrared light that belongs to the second wavelength range and is radiated from the second light radiator 80b to the projection surface SS is not reflected off the recursive reflector 540A but strongly reflected only off the recursive reflector 530A in the direction in which the infrared light is incident. The second captured image captured with the second camera 52b shows only the bright spot corresponding to the light reflected off the front end section 510A of the pointing element 500A.

In contrast, when the user of the pointing element 500B causes the front end section 510B of the pointing element 500B to approach the projection surface SS to write something on the projection image PS or otherwise manipulate the projection image PS, the infrared light that belongs to the first wavelength range and is radiated from the first light radiator 80a to the projection surface SS is not reflected off the recursive reflector 540B but is reflected only off the recursive reflector 530B in the direction in which the infrared light is incident. The first captured image captured with the first camera 52a therefore shows only a bright spot corresponding to the light reflected off the front end section 510B of the pointing element 500B. On the other hand, the infrared light that belongs to the second wavelength range and is radiated from the second light radiator 80b to the projection surface SS is more strongly reflected off the recursive reflector 530B and the recursive reflector 540B in the direction in which the infrared light is incident than in the other directions. The second captured image captured with the second camera 52b therefore shows a bright spot corresponding to the light reflected off the front end section 510B of the pointing element 500B and a bright spot corresponding to the light reflected off the shaft section 520B of the pointing element 500B.

Figure 13:
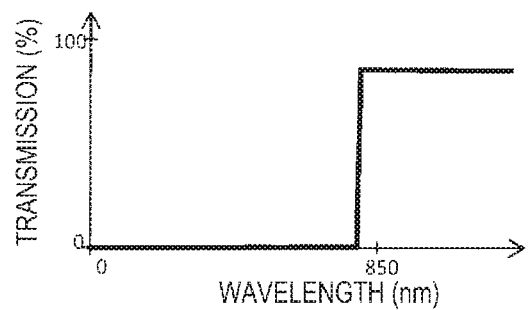
FIG. 13 shows an example of the transmission characteristic of a first wavelength cutoff filter used in the cameras.
Figure 14:
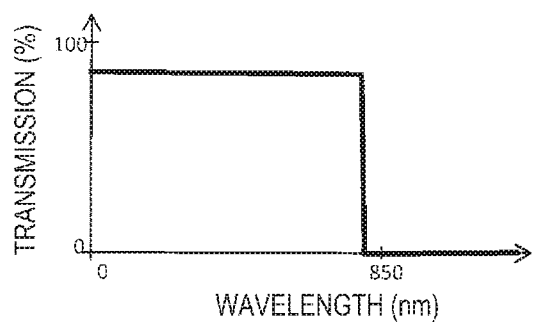
FIG. 14 shows an example of the transmission characteristic of a second wavelength cutoff filter used in the cameras.

Although not shown in FIG. 5 or 11 in detail, the first camera 52a and the second camera 52b each include an imaging device, such as a CMOS image sensor, and an imaging lens. Further, a visible light cutoff filter and an infrared light cutoff filter are so placed at the front surface of the imaging device as to be switchable from one to the other. FIG. 13 shows an example of the transmission characteristic of the visible light cutoff filter, and FIG. 14 shows an example of the transmission characteristic of the infrared light cutoff filter. The visible light cutoff filter transmits infrared light but does not transmit visible light, as shown in FIG. 13. In contrast, the infrared cutoff filter transmits visible light but does not transmit infrared light, as shown in FIG. 14. In typical use of the projector 100A, for example, when the projector 100A is used to project an image for presentation, the visible light cutoff filter is placed at the front surface of the imaging device of each of the first camera 52a and the second camera 52b. As a result, the first camera 52a and the second camera 52b can capture the infrared light radiated from the light radiator 80 and reflected off the pointing elements but cannot capture images of the projection image PS formed of visible light and projected on the projection surface SS. In contrast, in calibration performed when the projector 100A is installed, the infrared light cutoff filter is placed at the front surface of the imaging device of each of the first camera 52a and the second camera 52b. The projector 100A performs the calibration by projecting a projection image PS for calibration and capturing an image of the projection image PS.

In the calibration, the projector 100A generates and saves conversion information for converting a two-dimensional coordinate position in an image captured with each of the first camera 52a and the second camera 52b into a two-dimensional coordinate position on the projection surface SS. For example, the projector 100A generates a conversion lookup table that converts the coordinate system of the first and second captured images into a coordinate system of the projection surface SS corresponding to the projection image PS for each of the first camera 52a and the second camera 52b and stores the generated conversion lookup tables in the storage 70. The two-dimensional coordinates on the projection surface SS are specified by the axes x and y shown in FIG. 1. The axis x in FIG. 1 is an example of one of the two coordinates axes that specify the two-dimensional coordinates on the projection surface SS, and the axis y is an example of the other coordinate axis. In the following description, the coordinate system of a captured image, for example, the coordinate system having an origin located at the upper left corner of a captured image is called a camera coordinate system, and the coordinate system of the projection surface SS is called a projector coordinate system. The camera coordinate system is expressed by (Xc, Yc), and the projector coordinate system is expressed by (Xp, Yp) or (x, y). Further, in the following description, the conversion lookup table for the first camera 52a is called a first conversion lookup table, and the conversion lookup table for the second camera 52b is called a second conversion lookup table. Instead, a conversion function may be used and may perform calibration to calculate and store a conversion parameter, such as a conversion coefficient of the conversion function. The storage 70 is a nonvolatile memory for storing the first and second conversion lookup tables.

Figure 15:
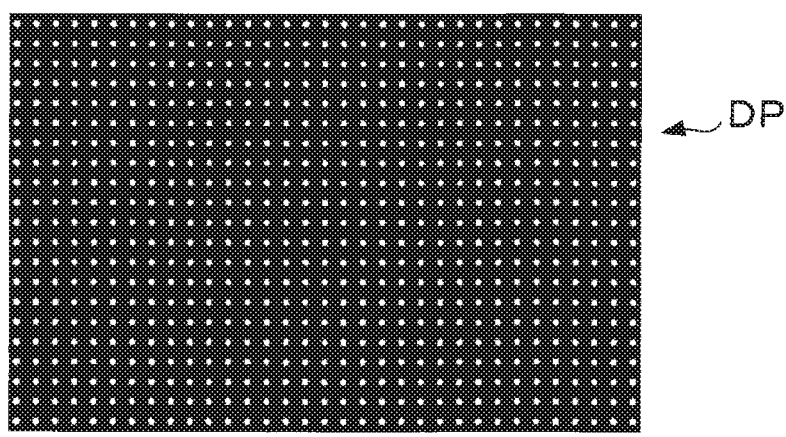
FIG. 15 shows an example of a calibration image having a dot pattern and projected by a projection section in calibration performed by the projector.
Figure 16:
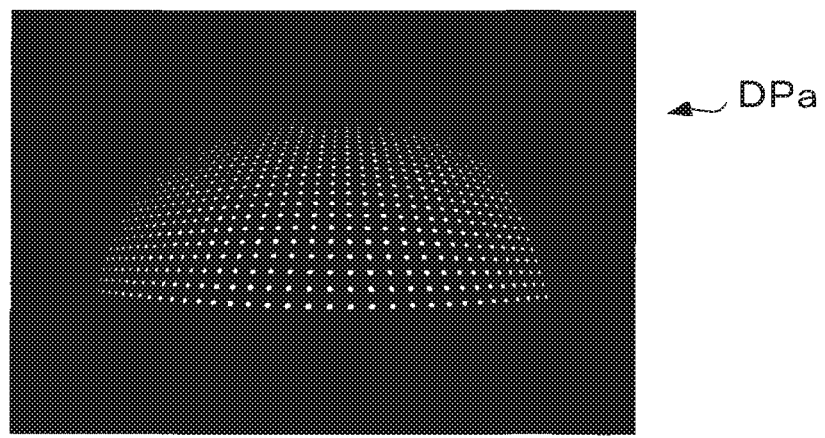
FIG. 16 shows an example of a captured image captured with the first camera in the calibration performed by the projector.
Figure 17:
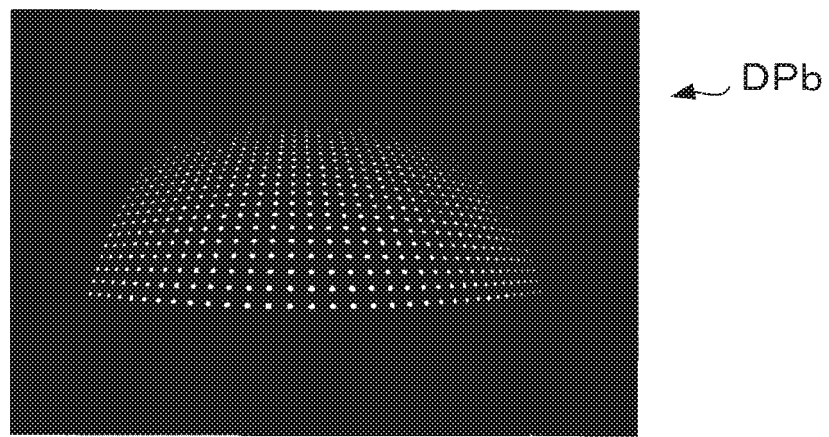
FIG. 17 shows an example of a captured image captured with the second camera in the calibration performed by the projector.

In the calibration, the projector 100A projects a calibration image DP having a dot pattern shown in FIG. 15 on the projection surface SS and causes the first camera 52a and the second camera 52b to each capture an image of the projection surface SS. FIG. 16 shows an example of a captured image DPa provided by causing the first camera 52a to capture an image of the projection surface SS on which the calibration image DP is projected. FIG. 17 shows an example of a captured image DPb provided by causing the second camera 52b to capture an image of the projection surface SS on which the calibration image DP is projected. The dot pattern displayed in the captured image DPa has distortion according to the position where the first camera 52a is installed, as clearly indicated by comparison between the calibration image DP and the captured image DPa. Similarly, the dot pattern displayed in the captured image DPb has distortion according to the position where the second camera 52b is installed, as clearly indicated by comparison between the calibration image DP and the captured image DPb. The projector 100A generates the first conversion lookup table by calculating the coordinates, in the camera coordinate system, of the center of gravity of each of the dots in the captured image DPa and determining the coordinates, in the projector coordinate system, of the position of the corresponding dot in the calibration image DP. As for an inter-dot pixel, the coordinates of the position of the inter-dot pixel in the projector coordinate system may be determined based on the coordinates of four dots around the inter-dot pixel by using bilinear interpolation. The projector 100A similarly generates the second conversion lookup table based on the captured image DPb and the calibration image DP.

The detection section 60 is coupled to the imaging section 50 and the drawing processing section 14, as shown in FIG. 5. The detection section 60 identifies the pointing elements 500A and 500B based on the first captured image captured with the first camera 52a and the second captured image captured with the second camera 52b and determines the position of each of the pointing elements 500A and 500B. When the detection section 60 determines that the front end section 510A is in contact with the projection surface SS, the detection section 60 detects the contact position as the position at which the pointing element 500A is pointing, and when the detection section 60 determines that the front end section 510B is in contact with the projection surface SS, the detection section 60 detects the contact position as the position at which the pointing element 500B is pointing. The detection section 60 includes a bright spot detector 62, a coordinate converter 64, and a position calculator 66.

The bright spot detector 62 detects, from the first captured image captured with the first camera 52a, a first bright spot candidate that is a candidate of the bright spot corresponding to the light reflected off the front end section 510A of the pointing element 500A or the bright spot corresponding to the light reflected off the front end section 510B of the pointing element 500B and a second bright spot candidate that is a candidate of the bright spot corresponding to the light reflected off the shaft section 520A of the pointing element 500A. Similarly, the bright spot detector 62 detects, from the second captured image captured with the second camera 52b, a third bright spot candidate that is a candidate of the bright spot corresponding to the light reflected off the front end section 510A of the pointing element 500A or the bright spot corresponding to the light reflected off the front end section 510B of the pointing element 500B and a fourth bright spot candidate that is a candidate of the bright spot corresponding to the light reflected off the shaft section 520B of the pointing element 500B. The transmission and reception of the captured image data from the detection section 60 to the imaging section 50 and vice versa may be performed via a line memory that stores image data corresponding to a plurality of lines. In this case, the bright spot detector 62 may sequentially read the captured image data from the line memory and sequentially start the detection of bright spot candidates from an area an image of which has been captured.

In more detail, the bright spot detector 62 detects, as the first bright spot candidate or the second bright spot candidate, an area where the number of pixels that belong to the area satisfies a predetermined condition out of locally bright areas in the first captured image captured with the first camera 52a. As for the third bright spot candidate and the fourth bright spot candidate, the bright spot detector 62 similarly detects, as the third bright spot candidate or the fourth bright spot candidate, an area where the number of pixels that belong to the area satisfies the predetermined condition out of locally bright areas in the second captured image captured with the second camera 52b.

Specifically, the bright spot detector 62 detects, as the first bright spot candidate, an area where the number of pixels that belong to the area falls within a first range out of areas each corresponding to a set of pixels each having a pixel value greater than or equal to a first threshold in the first captured image captured with the first camera 52a. The bright spot detector 62 detects, as the second bright spot candidate, an area where the number of pixels that belong to the area falls within a second range out of areas each corresponding to a set of pixels each having a pixel value greater than or equal to the first threshold in the first captured image captured with the first camera 52a. For example, provided that the pixel value representing the luminance of a pixel in the first captured image captured with the first camera 52a ranges from 0 to 255, and that a larger pixel value represents higher luminance, a specific example of the first threshold described above may be 230. A specific example of the first range may range from 1 to 10 pixels, and a specific example of the second range may range from 11 to 500 pixels. The same holds true for the third and fourth bright spot candidates. The bright spot detector 62 detects, as the third bright spot candidate, an area where the number of pixels that belong to the area falls within the first range out of areas each corresponding to a set of pixels each having a pixel value greater than or equal to the first threshold in the second captured image captured with the second camera 52b and detects, as the fourth bright spot candidate, an area where the number of pixels that belong to the area falls within the second range out of areas each corresponding to a set of pixels each having a pixel value greater than or equal to the first threshold in the second captured image captured with the second camera 52b. FIG. 18 shows an example of the detection of the bright spot candidates.

When the first captured image from the first camera 52a contains a plurality of areas each of which corresponds to a set of pixels each having a pixel value greater than or equal to the first threshold and in each of which the number of pixels that belong to the area falls within the first range, the bright spot detector 62 detects each of the plurality of areas as the first bright spot candidate. The same holds true for the second bright spot candidate. When a plurality of relevant areas are present, the bright spot detector 62 detects each of the plurality of areas as the second bright spot candidate. The same holds true for the third and fourth bright spot candidates. When the first captured image from the first camera 52a contains no area which corresponds to a set of pixels each having a pixel value greater than or equal to the first threshold and where the number of pixels that belong to the area falls within the first range, the bright spot detector 62 detects no first bright spot candidate. Similarly, when the first captured image from the first camera 52a contains no area which corresponds to a set of pixels each having a pixel value greater than or equal to the first threshold and where the number of pixels that belong to the area falls within the second range, the bright spot detector 62 detects no second bright spot candidate. The same holds true for the third and fourth bright spot candidates.

The coordinate converter 64 first calculates the position of the center of gravity of the area detected by the bright spot detector 62 and corresponding to the first bright spot candidate and sets the calculated position of the center of gravity to be the position of the first bright spot candidate. When the bright spot detector 62 detects a plurality of first bright spot candidates, the coordinate converter 64 calculates the position of each of the plurality of first bright spot candidates. The coordinate converter 64 similarly calculates the position of each of the second, third, and fourth bright spot candidates.

The coordinate converter 64 then refers to the first conversion lookup table stored in the storage 70 and converts the coordinates of the positions of the first and second bright spot candidates in the first captured image from the first camera 52a into first and second position coordinates each representing a position in the projector coordinate system. Similarly, the coordinate converter 64 refers to the second conversion lookup table stored in the storage 70 and converts the coordinates of the positions of the third and fourth bright spot candidates in the second captured image from the second camera 52b into third and fourth position coordinates each representing a position in the projector coordinate system. Conversion of the coordinates of the positions of the first and third bright spot candidates into position coordinates in the projector coordinate system allows evaluation of whether or not the front end section 510A of the pointing element 500A is in contact with the projection surface SS or the front end section 510B of the pointing element 500B is in contact with the projection surface SS based on the first and third position coordinates. The reason for this is as follows: For example, when the bright spots corresponding to the front end sections 510 of the pointing elements 500 are present on the projection surface SS, the first and third position coordinates coincide with each other. On the other hand, the farther the bright spots are from the projection surface SS in the axis-z direction, the greater the difference between the first position coordinates and the third position coordinates in the axis-x direction are. The characteristics described above can be used to evaluate whether or not the front end sections 510 are in contact with the projection surface SS. The second position coordinates can be used to identify the pointing element 500A, and the fourth position coordinates can be used to identify the pointing element 500B. FIG. 19 shows an example of the conversion.

The position calculator 66 classifies the first bright spot candidate as a bright spot candidate corresponding to the front end section 510A of the pointing element 500A or a bright spot candidate corresponding to the front end section 510B of the pointing element 500B based on the distance from the second bright spot candidate to the first bright spot candidate and associates the bright spot candidate corresponding to the front end section 510A of the pointing element 500A with the second bright spot candidate. In more detail, the position calculator 66 classifies a first bright spot candidate located in a circle having a center corresponding to the second bright spot candidate and having a radius corresponding to a predetermined number of pixels as the bright spot candidate corresponding to the front end section 510A of the pointing element 500A and a first bright spot candidate located outside the circle as the bright spot candidate corresponding to the front end section 510B of the pointing element 500B. Similarly, the position calculator 66 classifies the third bright spot candidate as a bright spot candidate corresponding to the front end section 510B of the pointing element 500B or a bright spot candidate corresponding to the front end section 510A of the pointing element 500A based on the distance from the fourth bright spot candidate to the third bright spot candidate and associates the bright spot candidate corresponding to the front end section 510B of the pointing element 500B with the fourth bright spot candidate. Specifically, the position calculator 66 classifies a third bright spot candidate located in a circle having a center corresponding to the fourth bright spot candidate and having a radius corresponding to the predetermined number of pixels as the bright spot candidate corresponding to the front end section 510B of the pointing element 500B and a third bright spot candidate located outside the circle as the bright spot candidate corresponding to the front end section 510A of the pointing element 500A. FIG. 20 shows an example of the classification.

The position calculator 66 then evaluates whether or not the front end section 510A of the pointing element 500A is in contact with the projection surface SS based on the difference in coordinates between the classified first bright spot candidate corresponding to the front end section 510A of the pointing element 500A and the classified third bright spot candidate corresponding to the front end section 510A of the pointing element 500A. Similarly, the position calculator 66 evaluates whether or not the front end section 510B of the pointing element 500B is in contact with the projection surface SS based on the difference in coordinates between the classified first bright spot candidate corresponding to the front end section 510B of the pointing element 500B and the classified third bright spot candidate corresponding to the front end section 510B of the pointing element 500B. When the position calculator 66 determines that the front end section 510A of the pointing element 500A is in contact with the projection surface SS, the position calculator 66 calculates the coordinates of the position of the front end section 510A of the pointing element 500A in the projector coordinate system and outputs position information representing the coordinates of the position to the drawing processing section 14. In more detail, the position calculator 66 calculates the coordinates of the position of the front end section 510A of the pointing element 500A in the projector coordinate system by using the first position coordinates of the classified first bright spot candidate corresponding to the front end section 510A of the pointing element 500A and the third position coordinates of the classified third bright spot candidate corresponding to the front end section 510A of the pointing element 500A. Similarly, when the position calculator 66 determines that the front end section 510B of the pointing element 500B is in contact with the projection surface SS, the position calculator 66 calculates the coordinates of the position of the front end section 510B of the pointing element 500B in the projector coordinate system and outputs position information representing the coordinates of the position to the drawing processing section 14. In more detail, the position calculator 66 calculates the coordinates of the position of the front end section 510B of the pointing element 500B in the projector coordinate system by using the first position coordinates of the classified first bright spot candidate corresponding to the front end section 510B of the pointing element 500B and the third position coordinates of the classified third bright spot candidate corresponding to the front end section 510B of the pointing element 500B.

For example, when first position coordinates (Xp1, Yp1) of the classified first bright spot candidate corresponding to the front end section 510A of the pointing element 500A is provided, and third position coordinates (Xp2, Yp2) of the classified third bright spot candidate corresponding to the front end section 510A of the pointing element 500A is provided, the position calculator 66 calculates a coordinate difference ($\Delta Xp$, $\Delta Yp$) in accordance with Expression 1 below. When at least one of the classified first bright spot candidate corresponding to the front end section 510A of the pointing element 500A and the classified third bright spot candidate corresponding to the front end section 510A of the pointing element 500A is formed of a plurality of bright spot candidates, the position calculator 66 calculates the coordinate difference for each combination of all the classified first and third bright spot candidates corresponding to the front end section 510A of the pointing element 500A. When one of the classified first bright spot candidate corresponding to the front end section 510A of the pointing element 500A and the classified third bright spot candidate corresponding to the front end section 510A of the pointing element 500A is not present, the position calculator 66 does not calculate the coordinate difference.

$$(\Delta Xp, \Delta Yp) = (Xp1 - Xp2, Yp1 - Yp2) \quad \text{(Expression 1)}$$

The position calculator 66 then evaluates whether or not the front end section 510A of the pointing element 500A is in contact with the projection surface SS based on the coordinate difference ($\Delta Xp$, $\Delta Yp$). In more detail, the following items (i) and (ii) are detected. (i) For the combination of first and third bright spot candidates showing that the coordinate difference $\Delta Xp$ along one of the coordinate axes is smaller than or equal to a third threshold and the coordinate difference $\Delta Yp$ along the other coordinate axis is smaller than or equal to the third threshold, the position calculator 66 detects the combination as the bright spot candidate corresponding to the front end section 510A in contact with the projection surface SS. That is, the combination of the first and third bright spot candidates satisfies $\Delta Xp$ third threshold and $\Delta Yp$ third threshold. (ii) For the combination of first and third bright spot candidates showing that third threshold<$\Delta Xp$≤fourth threshold and third threshold<$\Delta Yp$≤fourth threshold, the position calculator 66 detects the combination as the bright spot candidate corresponding to the front end section 510A not in contact with the projection surface SS, that is, the front end section 510A hovering above the projection surface SS. For the combination of first and third bright spot candidates to which neither (i) or (ii) applies, the position calculator 66 considers the combination to be a bright spot resulting from an origin other than the front end section 510A and excludes the combination from the bright spot candidates corresponding to the front end section 510A of the pointing element 500A. In the present embodiment, the third threshold is 4 pixels, and the fourth threshold is 30 pixels. An optimum value of each of the third and fourth thresholds described above varies in accordance with the gap D between the installed first camera 52a and second camera 52b, and the optimum value of each of the third and fourth thresholds described above may be specified by an experiment conducted as appropriate.

The position calculator 66 calculates the position coordinates (Xp, Yp) for each of the candidates of the front end sections 510 in contact with the projection surface SS and the front end sections 510 hovering above the projection surface SS in accordance with Expression 2 below. When only one candidate of the front end section 510A in contact with the projection surface SS is detected, the position calculator 66 determines that the front end section 510A of the pointing element 500A is in contact with the projection surface SS, finalizes the position coordinates (Xp, Yp) calculated in accordance with Expression 2 as the coordinates of the position of the front end section 510A, and outputs position information representing the position coordinates to the drawing processing section 14. The position calculator 66 similarly evaluates whether or not the front end section 510B of the pointing element 500B is in contact with the projection surface SS and calculates the coordinates of the contact position. FIG. 21 shows an example of the evaluation.

$$(Xp, Yp)=((Xp1+Xp2)/2,(Yp1+Yp2)/2) \quad \text{(Expression 2)}$$

Figure 22:
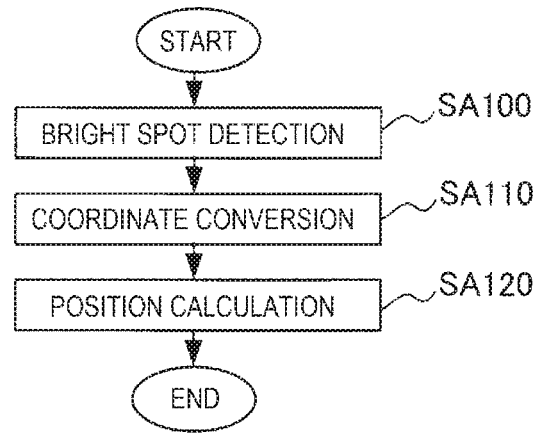
FIG. 22 is a flowchart showing the procedure of a position detection method carried out by the projector.

FIG. 22 is a flowchart showing the procedure of a position detection method carried out by the projector 100A. The position detection method is carried out whenever the imaging section 50 forms captured image data. The position detection method includes bright spot detection SA100, coordinate conversion SA110, and position calculation SA120, as shown in FIG. 22.

The bright spot detection SA100 is a process carried out by the bright spot detector 62. In the bright spot detection SA100, the projector 100A detects the first and second bright spot candidates from the first captured image from the first camera 52a and the third and fourth bright spot candidates from the second captured image from the second camera 52b.

The coordinate conversion SA110 is a process carried out by the coordinate converter 64. In the coordinate conversion SA110, the projector 100A converts the position of the first bright spot candidate and the position of the second bright spot candidate in the first captured image from the first camera 52a into the first and second position coordinates in the projector coordinate system. The projector 100A further converts the position of the third bright spot candidate and the position of the fourth bright spot candidate in the second captured image from the second camera 52b into the third and fourth position coordinates in the projector coordinate system.

The position calculation SA120 is a process carried out by the position calculator 66. In the position calculation SA120, the projector 100A classifies the first bright spot candidate as the bright spot candidate corresponding to the front end section 510A of the pointing element 500A or a bright spot candidate corresponding to the front end section 510B of the pointing element 500B based on the distance from the second bright spot candidate to the first bright spot candidate. The projector 100A further classifies the third bright spot candidate as the bright spot candidate corresponding to the front end section 510A of the pointing element 500A or a bright spot candidate corresponding to the front end section 510B of the pointing element 500B based on the distance from the fourth bright spot candidate to the third bright spot candidate.

The projector 100A then evaluates whether or not the front end section 510A of the pointing element 500A is in contact with the projection surface SS based on the difference in coordinates between the classified first bright spot candidate corresponding to the front end section 510A of the pointing element 500A and the classified third bright spot candidate corresponding to the front end section 510A of the pointing element 500A. Similarly, the projector 100A evaluates whether or not the front end section 510B of the pointing element 500B is in contact with the projection surface SS based on the difference in coordinates between the classified first bright spot candidate corresponding to the front end section 510B of the pointing element 500B and the classified third bright spot candidate corresponding to the front end section 510B of the pointing element 500B.

When the projector 100A determines that the front end section 510A of the pointing element 500A is in contact with the projection surface SS, the projector 100A calculates the coordinates of the position of the front end section 510A of the pointing element 500A in the projector coordinate system based on the classified first and third bright spot candidates corresponding to the front end section 510A of the pointing element 500A. Similarly, when the projector 100A determines that the front end section 510B of the pointing element 500B is in contact with the projection surface SS, the projector 100A calculates the coordinates of the position of the front end section 510B of the pointing element 500B in the projector coordinate system based on the classified first and third bright spot candidates corresponding to the front end section 510B of the pointing element 500B.

In the projection system 300A of the present embodiment, the bright spot corresponding to the shaft section 520A of the pointing element 500A is identified in accordance with which captured image displays the bright spot, the first captured image from the first camera 52a or the second captured image from the second camera 52b, and so is the bright spot corresponding to the shaft section 520B of the pointing element 500B. The bright spot corresponding to the light reflected off the front end section 510A or 510B is classified as a bright spot corresponding to the front end section 510A of the pointing element 500A or a bright spot corresponding to the front end section 510B of the pointing element 500B in accordance with the distance from the bright spot corresponding to the light reflected off the shaft section 520A or 520B to the bright spot corresponding to the light reflected off the front end section, and whether or not the front end section 510A is in contact with the projection surface SS and whether or not the front end section 510B is in contact with the projection surface SS are separately and independently evaluated. Therefore, even when different users use the pointing elements 500A and 500B respectively, the evaluation of whether or not the front end section 510A is in contact with the projection surface SS and whether or not the front end section 510B is in contact with the projection surface SS can be separately and independently evaluated, and so can be the calculation of the contact positions.

The front end sections 510 of the pointing elements 500 in the present embodiment are each not self-luminous and therefore consume no electric power of a battery. The position where any of the front end sections 510 is in contact with the projection surface SS can be accurately calculated based on triangulation.

As described above, according to the present embodiment, the pointing elements 500A and 500B can be identified without use of self-luminous pointing elements 500, and whether or not the front end section 510A or 510B is in contact with the projection surface SS can be detected with improved accuracy.

The projection system 300A of the embodiment described above includes the two pointing elements 500. When the projection system 300A includes three or more pointing elements 500, a third wavelength range, a fourth wavelength range, . . . may be used. For example, a third pointing element 500 is added to the projection system 300A, a third camera disposed in a position different from the positions of the first camera 52a and the second camera 52b and a third light radiator that is so disposed as to be adjacent to the third camera and radiates infrared light that belongs to the third wavelength range onto the projection surface SS are added to the projector 100A. The shaft 520 of the third pointing element 500 may be provided with a reflection filter that reflects the infrared light that belongs to the third wavelength range. That is, Expression 3 below is satisfied.

$$N = \text{number of wavelength ranges of infrared light to be radiated onto projection surface } SS \text{ number of cameras of imaging section 50} \quad \text{(Expression 3)}$$

where N represents the number of pointing elements 500 provided in the projection system 300A A camera capable of simultaneous imaging of infrared light fluxes that belong to a plurality of wavelength ranges, such as a multi-spectra camera, may be used as the cameras. It is, however, noted that at least two cameras are still required to evaluate whether or not the front end sections 510 of the pointing elements 500 are in contact with the projection surface SS based on triangulation.

2. Second Embodiment

Figure 23:
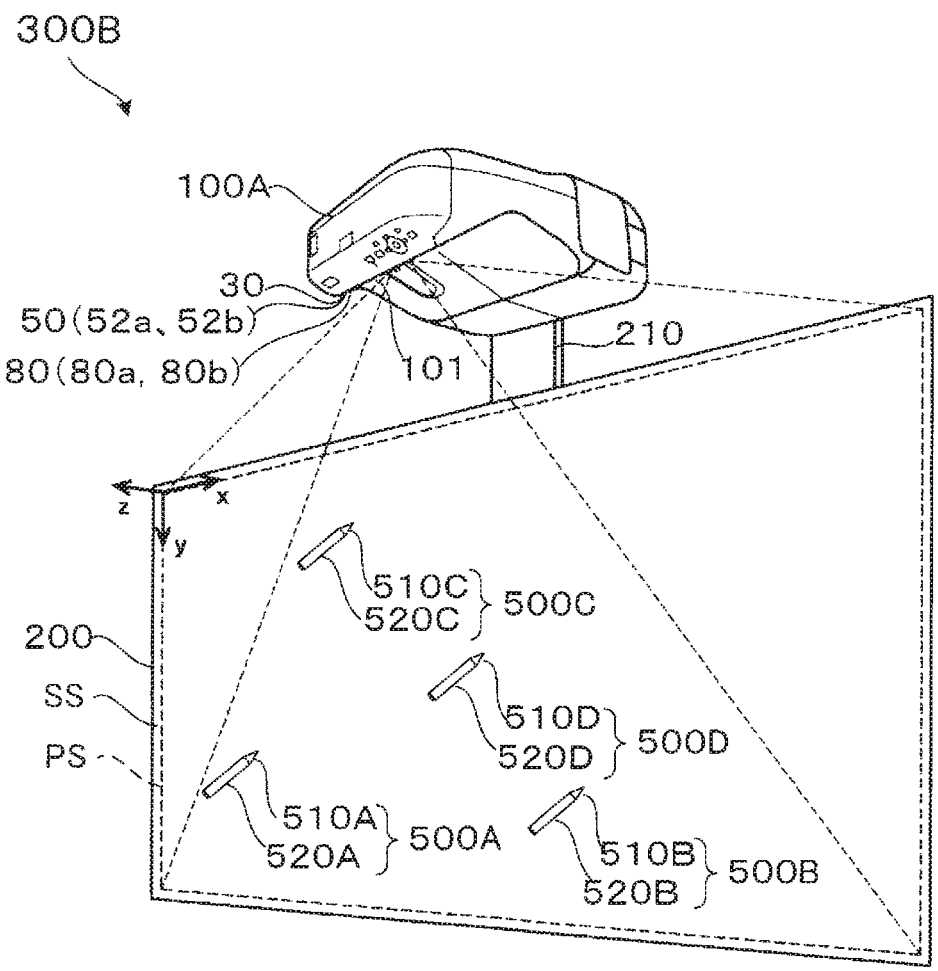
FIG. 23 is a perspective view of a projection system according to a second embodiment of the present disclosure.

FIG. 23 shows an example of the configuration of a projection system 300B of a second embodiment of the present disclosure. In FIG. 23, the same components as those in FIG. 1 have the same reference characters. The projection system 300B has a configuration in which the projection system 300A of the first embodiment is further provided with pointing elements 500C and 500D. The pointing element 500C is an example of a third pointing element, and the pointing element 500D is an example of a fourth pointing element.

The pointing element 500C includes a front end section 510C and a shaft section 520C, and the pointing element 500D includes a front end section 510D and a shaft section 520D, as shown in FIG. 23. The front end section 510C of the pointing element 500C is an example of a third front end section, and the shaft section 520C of the pointing element 500C is an example of a third shaft section. The front end section 510D of the pointing element 500D is an example of a fourth front end section, and the shaft section 520D of the pointing element 500D is an example of a fourth shaft section.

Figure 24:
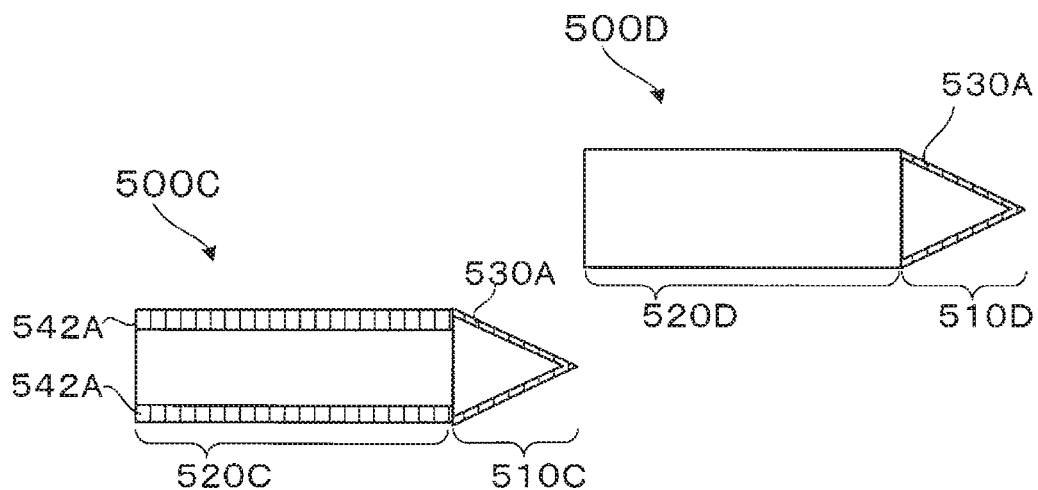
FIG. 24 shows an example of the configurations of pointing elements.

FIG. 24 shows an example of the configurations of the pointing elements 500C and 500D. The pointing element 500C differs from the pointing element 500A in that the pointing element 500C includes no color filter 544A, and the pointing element 500D differs from the pointing element 500A in that the pointing element 500D includes no color filter 544A or recursive reflection member 542A. The recursive reflectors 530A and the recursive reflection member 542A of the pointing element 500C are an example of a fifth recursive reflector, and the recursive reflectors 530A of the pointing element 500D are an example of a sixth recursive reflector.

Figure 25:
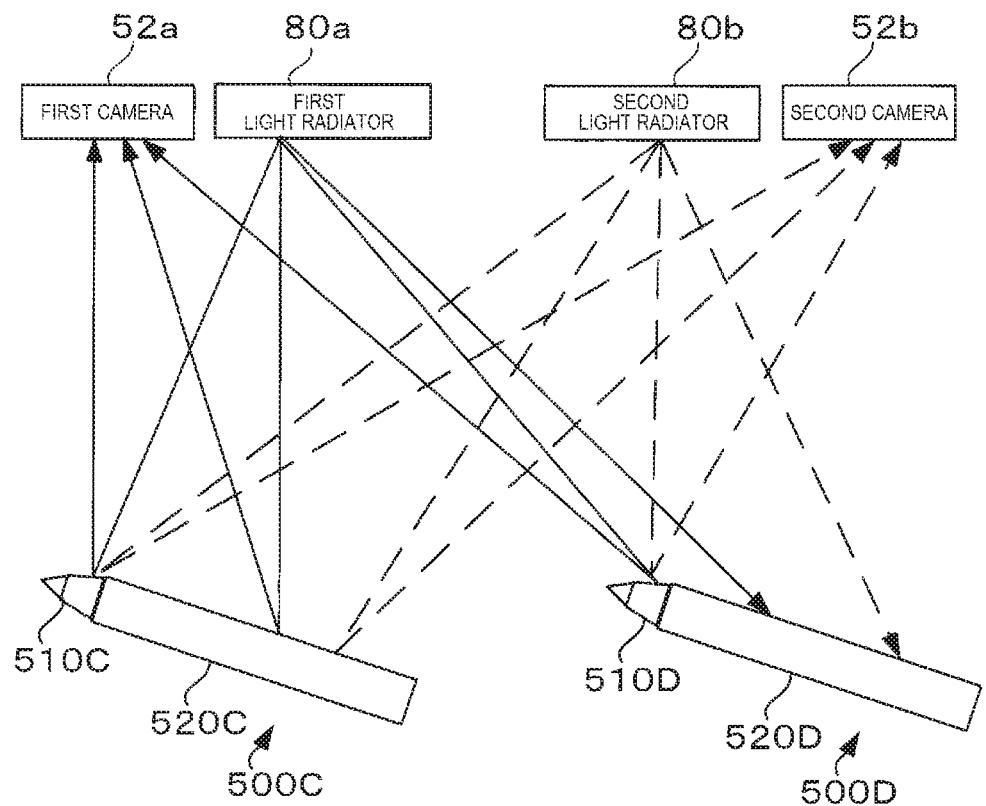
FIG. 25 shows an example of the optical paths of the infrared light that is radiated from the first and second light radiators, is recursively reflected off the pointing elements, and reaches the first and second cameras.

FIG. 25 shows an example of the optical paths of the infrared light that is radiated from the first light radiator 80a, is recursively reflected off the pointing element 500C or 500D, and reaches the first camera 52a and the optical paths of the infrared light that is radiated from the second light radiator 80b, is recursively reflected off the pointing element 500C or 500D, and reaches the second camera 52b. The optical paths of the infrared light that is radiated from the first light radiator 80a, is recursively reflected off the pointing element 500A or 500B, and reaches the first camera 52a and the optical paths of the infrared light that is radiated from the second light radiator 80b, is recursively reflected off the pointing element 500A or 500B, and reaches the second camera 52b are the same as those in the first embodiment.

In FIG. 25, the optical paths of the infrared light radiated from the first light radiator 80a are drawn with the solid-line arrows, and the optical paths of the infrared light radiated from the second light radiator 80b are drawn with the broken-line arrows. When the user of the pointing element 500C causes the front end section 510C of the pointing element 500C to approach the projection surface SS to write something on the projection image PS or otherwise manipulate the projection image PS, the infrared light radiated from the first light radiator 80a to the projection surface SS is more strongly reflected off the recursive reflector 530A of the front end section 510C and the recursive reflection member 542A of the shaft section 520C in the direction in which the infrared light is incident than in the other directions. The first captured image captured with the first camera 52a therefore shows a bright spot corresponding to the light reflected off the front end section 510C of the pointing element 500C and a bright spot corresponding to the light reflected off the shaft section 520C of the pointing element 500C. The same holds true for the infrared light radiated from the second light radiator 80b to the projection surface SS, and the second captured image captured with the second camera 52b shows a bright spot corresponding to the light reflected off the front end section 510C of the pointing element 500C and a bright spot corresponding to the light reflected off the shaft section 520C of the pointing element 500C.

In contrast, when the user of the pointing element 500D causes the front end section 510D of the pointing element 500D to approach the projection surface SS to write something on the projection image PS or otherwise manipulate the projection image PS, the infrared light radiated from the first light radiator 80a to the projection surface SS is more strongly reflected only off the recursive reflector 530A of the front end section 510D in the direction in which the infrared light is incident than in the other directions. The first captured image captured with the first camera 52a therefore shows only a bright spot corresponding to the light reflected off the front end section 510D of the pointing element 500D. The same holds true for the infrared light radiated from the second light radiator 80b to the projection surface SS, and the second captured image captured with the second camera 52b shows only a bright spot corresponding to the light reflected off the front end section 510D of the pointing element 500D.

In the present embodiment, the first captured image from the first camera 52a displays the bright spot corresponding to the front end section 510A of the pointing element 500A, the bright spot corresponding to the shaft section 520A of the pointing element 500A, the bright spot corresponding to the front end section 510B of the pointing element 500B, the bright spot corresponding to the front end section 510C of the pointing element 500C, the bright spot corresponding to the shaft section 520C of the pointing element 500C, and the bright spot corresponding to the front end section 510D of the pointing element 500D. That is, the first bright spot candidate in the present embodiment includes the bright spot candidate corresponding to the front end section 510A of the pointing element 500A, the bright spot corresponding to the front end section 510B of the pointing element 500B, the bright spot corresponding to the front end section 510C of the pointing element 500C, and the bright spot corresponding to the front end section 510D of the pointing element 500D. The second bright spot candidate in the present embodiment includes the bright spot corresponding to the shaft section 520A of the pointing element 500A and the bright spot corresponding to the shaft section 520C of the pointing element 500C.

In contrast, the second captured image from the second camera 52b displays the bright spot corresponding to the front end section 510A of the pointing element 500A, the bright spot corresponding to the front end section 510B of the pointing element 500B, the bright spot corresponding to the shaft section 520B of the pointing element 500B, the bright spot corresponding to the front end section 510C of the pointing element 500C, the bright spot corresponding to the shaft section 520C of the pointing element 500C, and the bright spot corresponding to the front end section 510D of the pointing element 500D. That is, the third bright spot candidate in the present embodiment includes the bright spot candidate corresponding to the front end section 510A of the pointing element 500A, the bright spot corresponding to the front end section 510B of the pointing element 500B, the bright spot corresponding to the front end section 510C of the pointing element 500C, and the bright spot corresponding to the front end section 510D of the pointing element 500D. The fourth bright spot candidate in the present embodiment includes the bright spot corresponding to the shaft section 520B of the pointing element 500B and the bright spot corresponding to the shaft section 520C of the pointing element 500C.

Also in the present embodiment, the projector 100A carries out the position detection method shown in FIG. 22. The contents of the bright spot detection SA100 and the coordinate conversion SA110, which are processes of the position detection method, are the same as those in the first embodiment. In the position calculation SA120 in the present embodiment, the position calculator 66 classifies, in accordance with whether or not a corresponding fourth bright spot candidate is present, the second bright spot candidate as a bright spot candidate corresponding to the shaft section 520A of the pointing element 500A and a bright spot candidate corresponding to the shaft section 520C of the pointing element 500C. The situation in which the second bright spot candidate corresponds to the fourth bright spot candidate means that the difference in coordinates between the two bright spot candidates falls within a predetermined range.

In more detail, the position calculator 66 classifies a second bright spot candidate having a corresponding fourth bright spot candidate as the bright spot candidate corresponding to the shaft section 520C of the pointing element 500C and classifies a second bright spot candidate having no corresponding fourth bright spot candidate as the bright spot candidate corresponding to the shaft section 520A of the pointing element 500A. Similarly, the position calculator 66 classifies, in accordance with whether or not a corresponding second bright spot candidate is present, the fourth bright spot candidate as a bright spot candidate corresponding to the shaft section 520B of the pointing element 500B and a bright spot candidate corresponding to the shaft section 520C of the pointing element 500C. Specifically, the position calculator 66 classifies a fourth bright spot candidate having a corresponding second bright spot candidate as the bright spot candidate corresponding to the shaft section 520C of the pointing element 500C and classifies a fourth bright spot candidate having no corresponding second bright spot candidate as the bright spot candidate corresponding to the shaft section 520B of the pointing element 500B.

The position calculator 66 then classifies a first bright spot candidate separated by a predetermined distance or shorter from the classified second bright spot candidate corresponding to the shaft section 520A of the pointing element 500A as the first bright spot candidate corresponding to the shaft section 520A of the pointing element 500A and a first bright spot candidate separated by the predetermined distance or shorter from the classified second bright spot candidate corresponding to the shaft section 520C of the pointing element 500C as the first bright spot candidate corresponding to the front end section 510C of the pointing element 500C. The position calculator 66 further classifies a third bright spot candidate separated by the predetermined distance or shorter from the classified fourth bright spot candidate corresponding to the shaft section 520B of the pointing element 500B as the third bright spot candidate corresponding to the shaft section 520B of the pointing element 500B and a third bright spot candidate separated by the predetermined distance or shorter from the classified fourth bright spot candidate corresponding to the shaft section 520C of the pointing element 500C as the third bright spot candidate corresponding to the front end section 510C of the pointing element 500C.

The position calculator 66 then classifies, out of non-classified first bright spot candidates, a bright spot candidate corresponding to the classified third bright spot candidate corresponding to the shaft section 520B of the pointing element 500B as the first bright spot candidate corresponding to the front end section 510B of the pointing element 500B and classifies the other bright spot candidates as the first bright spot candidate corresponding to the front end section 510D of the pointing element 500D. Similarly, The position calculator 66 classifies, out of non-classified third bright spot candidates, a bright spot candidate corresponding to the classified first bright spot candidate corresponding to the front end section 510A of the pointing element 500A as the third bright spot candidate corresponding to the front end section 510A of the pointing element 500A and classifies the other bright spot candidates as the third bright spot candidate corresponding to the front end section 510D of the pointing element 500D.

Having completed the classification of the first and third bright spot candidates by using the procedure outlined above, the position calculator 66 evaluates whether or not the front end section 510 of each of the pointing elements 500A, 500B, 500C, and 500D is in contact with the projection surface SS separately from each other in accordance with the difference in coordinates between the first bright spot candidate and the third bright spot candidate, as in the first embodiment. The present embodiment therefore also provides the same effects provided by the first embodiment.

3. Third Embodiment

Figure 26:
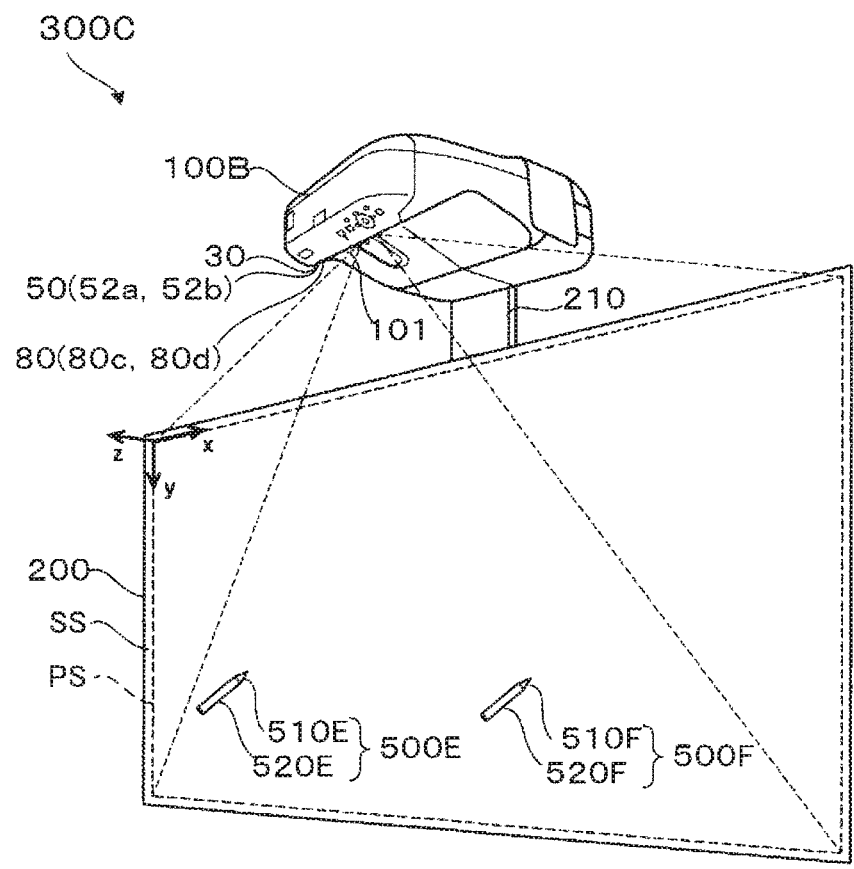
FIG. 26 shows an example of the configuration of a projection system according to a third embodiment of the present disclosure.

FIG. 26 shows an example of the configuration of a projection system 300C of a third embodiment of the present disclosure. In FIG. 26, the same components as those in FIG. 1 have the same reference characters. The projection system 300C has a configuration in which the pointing elements 500A and 500B and the projector 100A in the first embodiment are replaced with pointing elements 500E and 500F and projector 100B. The projector 100B includes a first light radiator 80c and a second light radiator 80d in place of the first light radiator 80a and the second light radiator 80b. The pointing element 500E is an example of the first pointing element, and the pointing element 500F is an example of the second pointing element.

Figure 27:
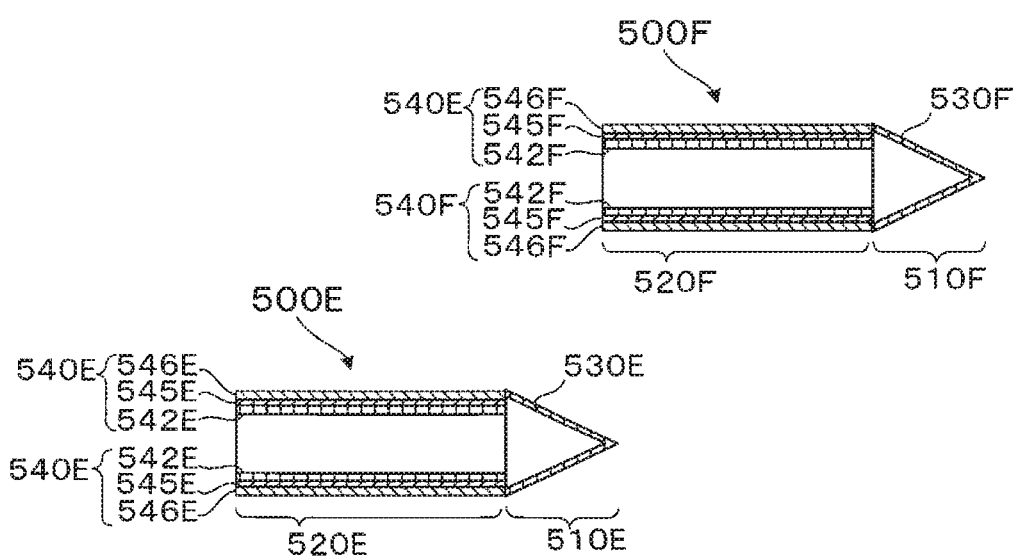
FIG. 27 shows an example of the configurations of pointing elements provided in the projection system.

FIG. 27 shows an example of the configurations of the pointing elements 500E and 500F. The pointing element 500E includes a front end section 510E and a shaft section 520E, which is held by a user of the pointing element 500E. The pointing element 500F includes a front end section 510F and a shaft section 520F, which is held by a user of the pointing element 500F. The front end section 510E of the pointing element 500E is an example of the first front end section, and the shaft section 520E of the pointing element 500E is an example of the first shaft section. The front end section 510F of the pointing element 500F is an example of the second front end section, and the shaft section 520F of the pointing element 500F is an example of the second shaft section.

The front end section 510E of the pointing element 500E is provided with a recursive reflector 530E, and the front end section 510F of the pointing element 500F is provided with a recursive reflector 530F. The recursive reflectors 530E and 530F are each made of a recursive reflection material having reflectance of the first infrared light and reflectance of the second infrared light each being higher than a predetermined value. The recursive reflectors 530E and 530F therefore each reflect each of the first infrared light and the second infrared light in the direction in which the infrared light is incident more strongly than in the other directions. The recursive reflector 530E provided at the front end section 510E of the pointing element 500E is an example of the third recursive reflector, and the recursive reflector 530F provided at the front end section 510F of the pointing element 500F is an example of the fourth recursive reflector.

The shaft section 520E of the pointing element 500E is provided with a recursive reflector 540E having reflectance of second infrared light lower than the reflectance of first infrared light. The shaft section 520F of the pointing element 500F is provided with a recursive reflector 540F having reflectance of first infrared light lower than the reflectance of second infrared light. The recursive reflector 540E includes a recursive reflection member 542E, a linearly polarizing plate 545E, and a quarter wave plate 546E. The recursive reflection member 542E is covered with the linearly polarizing plate 545E and the quarter wave plate 546E. The quarter wave plate 546E is so configured that the delay axis thereof inclines by +45 degrees with respect to the absorption axis of the linearly polarizing plate 545E. The thus configured shaft section 520E of the pointing element 500E has a reflection characteristic that causes the shaft section 520E to reflect right-handed circularly polarized light but not to reflect left-handed circularly polarized light. The right-handed circularly polarized light is an example of the first infrared light and an example of the light having the first optical characteristic. The left-handed circularly polarized light is an example of the second infrared light and an example of the light having the second optical characteristic. The reflection characteristic in which right-handed circularly polarized light is reflected but left-handed circularly polarized light is not reflected is an example of the first reflection characteristic. The recursive reflector 540F includes a recursive reflection member 542F, a linearly polarizing plate 545F, and a quarter wave plate 546F. The recursive reflection member 542F is covered with the linearly polarizing plate 545F and the quarter wave plate 546F. The quarter wave plate 546F is so configured that the delay axis thereof inclines by −45 degrees with respect to the absorption axis of the linearly polarizing plate 545F. The thus configured shaft section 520F of the pointing element 500F has a reflection characteristic that causes the shaft section 520F not to reflect right-handed circularly polarized light but reflect left-handed circularly polarized light. The reflection characteristic in which right-handed circularly polarized light is not reflected but left-handed circularly polarized light is reflected is an example of the second reflection characteristic. The recursive reflector 540E provided at the shaft section 520E of the pointing element 500E is an example of the first recursive reflector, and the recursive reflector 540F provided at the shaft section 520F of the pointing element 500F is an example of the second recursive reflector.

The first light radiator 80c is configured to output right-handed circularly polarized light. For example, an optical filter formed of the linearly polarizing plate 545E and the quarter wave plate 546E used in the pointing element 500E is so set on the light exiting side of the IR light source provided in the first light radiator 80c to allow the first light radiator 80c to output right-handed circularly polarized light. Further, the second light radiator 80d is configured to output left-handed circularly polarized light. For example, an optical filter formed of the linearly polarizing plate 545F and the quarter wave plate 546F used in the pointing element 500F is so set on the light exiting side of the IR light source provided in the second light radiator 80d to allow the second light radiator 80d to output left-handed circularly polarized light. The right-handed circularly polarized light is an example of light having a first polarization state, and the left-handed circularly polarized light is an example of light having a second polarization state.

4. Other Embodiments

The embodiments described above may each be combined with any of the following variations as appropriate.

(1) The projector 100A or 100B may each be manufactured and sold as a standalone product, or the pointing elements 500A to 500F may each be manufactured and sold as a standalone product. The projector 100A may form a position detection system in which the projector includes no projection section 30 but functions as a position detection apparatus. The position detection system can be achieved as follows: The projection surface SS is replaced with a flat panel display, such as an image display panel capable of displaying an image corresponding to the projection image PS; the position display apparatus is installed as part of the flat panel display; the image display surface of the flat panel display is configured to serve as an operation surface; and the users of the pointing elements 500A and 500B can each point at a position on the operation surface. In the position detection system, the position detection method shown in FIG. 22 is carried out as a method for controlling the position detection system. The position detection system may instead be so configured that the projector 100A is replaced with the projector 100B and the pointing elements 500A and 500B are replaced with the pointing elements 500E and 500F.

(2) The detection section 60 of the projector 100A in the first embodiment described above includes the bright spot detector 62, the coordinate converter 64, and the position calculator 66. However, when only identification of the pointing elements 500A and 500B is required, it is unnecessary to provide the front end section 510A of the pointing element 500A with the recursive reflector 530A, and it is unnecessary to provide the front end section 510B of the pointing element 500B with the recursive reflector 530B. Further, it is unnecessary to provide the projector 100A with the coordinate converter 64 or the position calculator 66. The reason for this is that the first captured image from the first camera 52a does not display the bright spot corresponding to the shaft section 520B of the pointing element 500B, and the second captured image from the second camera 52b does not display the bright spot corresponding to the shaft section 520A of the pointing element 500A, as described above, so that a bright spot displayed in the first captured image from the first camera 52a can be identified as the bright spot corresponding to the shaft section 520A of the pointing element 500A and a bright spot displayed in the second captured image from the second camera 52b can be identified as the bright spot corresponding to the shaft section 520B of the pointing element 500B.

(3) The detection section 60 be formed of an electronic circuit, such as an ASIC. A program that causes a typical computer to function as the detection section 60 may be manufactured and distributed as a standalone product. The reason for this is that causing a computer of a related-art projector that includes light radiators that radiate first and second infrared light to a projection surface and two cameras and detects the position of a front end section of a pointing element based on triangulation to be operated in accordance with the program allows the projector to function as the projector 100A in any of the first and second embodiments described above. Conceivable examples of a specific method for distributing the program described above may include an aspect in which a computer readable recording medium, such as a flash ROM (read only memory), on which the program described above is written is distributed and an aspect in which the program described above is distributed as a program downloaded via an electric communication line, such as the Internet.

What is claimed is:

1. A projection system comprising:
   a projector that projects a projection image on a projection surface;
   a first pointing element that points at the projection surface; and
   a second pointing element that points at the projection surface,
   wherein the first pointing element includes a first recursive reflector having a first reflection characteristic,
   the second pointing element includes a second recursive reflector having a second reflection characteristic different from the first reflection characteristic, and
   the projector includes
   a first camera that captures an image of the projection surface,
   a second camera that is disposed in a position different from a position of the first camera and captures an image of the projection surface,
   a first light radiator that is provided in correspondence with the first camera and radiates light having a first optical characteristic onto the projection surface,
   a second light radiator that is provided in correspondence with the second camera and radiates light having a second optical characteristic different from the first optical characteristic onto the projection surface, and
   a detection section that detects the first pointing element based on a first captured image provided when the first camera captures an image of the projection surface, detects the second pointing element based on a second captured image provided when the second camera captures an image of the projection surface, and detects a position which is located on the projection surface and at which the first pointing element is pointing and a position which is located on the projection surface and at which the second pointing element is pointing based on the first and second captured images.

2. The projection system according to claim 1,
   wherein the first light radiator radiates light that belongs to a first wavelength range onto the projection surface,
   the second light radiator radiates light that belongs to a second wavelength range different from the first wavelength range onto the projection surface,
   the first recursive reflector has a reflection characteristic so characterized that reflectance of the light that belongs to the second wavelength range is lower than reflectance of the light that belongs to the first wavelength range, and
   the second recursive reflector has a reflection characteristic so characterized that reflectance of the light that belongs to the first wavelength range is lower than reflectance of the light that belongs to the second wavelength range.

3. The projection system according to claim 2,
   the first pointing element includes a first front end section and a first shaft section, with the first shaft section provided with the first recursive reflector, and the first front end section provided with a third recursive reflector having reflectance of the light that belongs to the first wavelength range being higher than or equal to a predetermine value and reflectance of the light that belongs to the second wavelength range being higher than or equal to the predetermine value,
   the second pointing element includes a second front end section and a second shaft section, with the second shaft section provided with the second recursive reflector, and the second front end section provided with a fourth recursive reflector having reflectance of the light that belongs to the first wavelength range being higher than or equal to the predetermine value and reflectance of the light that belongs to the second wavelength range being higher than or equal to the predetermine value, and
   the detection section evaluates whether or not the first front end section is in contact with the projection surface based on the first and second captured images and calculates a position where the first front end section is in contact with the projection surface when the detection section determines that the first front end section is in contact with the projection surface, and the detection section evaluates whether or not the second front end section is in contact with the projection surface based on the first and second captured images and calculates a position where the second front end section is in contact with the projection surface when the detection section determines that the second front end section is in contact with the projection surface.

4. The projection system according to claim 2, further comprising:
   a third pointing element including a third front end section and a third shaft section, with the third front end section and the third shaft section each provided with the fifth recursive reflector having reflectance of the light that belongs to the first wavelength range being higher than or equal to a predetermine value and reflectance of the light that belongs to the second wavelength range being higher than or equal to the predetermine value,
   a fourth pointing element including a fourth front end section and a fourth shaft section, with the fourth front end section provided with the sixth recursive reflector having reflectance of the light that belongs to the first wavelength range being higher than or equal to a predetermine value and reflectance of the light that belongs to the second wavelength range being higher than or equal to the predetermine value, and
   the detection section identifies the first pointing element, the second pointing element, the third pointing element, and the fourth pointing element from one another based on the first and second captured images.

5. The projection system according to claim 1,
   wherein the first light radiator radiates light having a first polarization state onto the projection surface,
   the second light radiator radiates light having a second polarization state different from the first polarization state onto the projection surface, the first recursive reflector reflects the light having the first polarization state but does not reflect the light having the second polarization state, and the second recursive reflector does not reflect the light having the first polarization state but reflects the light having the second polarization state.

6. The projection system according to claim 5, wherein the first pointing element includes a first front end section and a first shaft section, with the first shaft section provided with the first recursive reflector, and the first front end section provided with a third recursive reflector that reflects the light having the first polarization state and further reflects the light having the second polarization state, the second pointing element includes a second front end section and a second shaft section, with the second shaft section provided with the second recursive reflector, and the second front end section provided with a fourth recursive reflector that reflects the light having the first polarization state and further reflects the light having the second polarization state, and the detection section evaluates whether or not the first front end section is in contact with the projection surface based on the first and second captured images and calculates a position where the first front end section is in contact with the projection surface when the detection section determines that the first front end section is in contact with the projection surface, and the detection section evaluates whether or not the second front end section is in contact with the projection surface based on the first and second captured images and calculates a position where the second front end section is in contact with the projection surface when the detection section determines that the second front end section is in contact with the projection surface.

7. A position detection system comprising: a first pointing element and a second pointing element that each point at an operation surface; and a position detection apparatus that detects positions at which the first and second pointing elements are pointing, wherein the first pointing element includes a first recursive reflector having a first reflection characteristic, the second pointing element includes a second recursive reflector having a second reflection characteristic different from the first reflection characteristic, and the position detection apparatus includes a first camera that captures an image of the operation surface, a second camera that is disposed in a position different from a position of the first camera and captures an image of the operation surface, a first light radiator that is provided in correspondence with the first camera and radiates light having a first optical characteristic onto the operation surface, a second light radiator that is provided in correspondence with the second camera and radiates light having a second optical characteristic different from the first optical characteristic onto the operation surface, and a detection section that detects the first pointing element based on a first captured image provided when the first camera captures an image of the operation surface, detects the second pointing element based on a second captured image provided when the second camera captures an image of the operation surface, and detects a position which is located on the operation surface and at which the first pointing element is pointing and a position which is located on the operation surface and at which the second pointing element is pointing based on the first and second captured images.

8. A position detection method for controlling a position detection system including a first pointing element and a second pointing element that each point at an operation surface and a position detection apparatus that detects positions at which the first and second pointing elements are pointing, wherein the first pointing element includes a first recursive reflector having a first reflection characteristic, and the second pointing element includes a second recursive reflector having a second reflection characteristic different from the first reflection characteristic, and the position detection apparatus detects the first pointing element based on a first captured image provided when a first camera captures an image of the operation surface, the first camera provided in correspondence with a first light radiator that radiates light having a first optical characteristic onto the operation surface, detects the second pointing element based on a second captured image provided when a second camera captures an image of the operation surface, the second camera provided in correspondence with a second light radiator that radiates light having a second optical characteristic different from the first optical characteristic onto the operation surface, and detects a position which is located on the operation surface and at which the first pointing element is pointing and a position which is located on the operation surface and at which the second pointing element is pointing based on the first and second captured images.

* * * * *